United States Patent [19]
Udaka et al.

[11] Patent Number: 4,748,798
[45] Date of Patent: Jun. 7, 1988

[54] APPARATUS FOR AUTOMATICALLY LOADING NUCLEAR FUEL PELLETS

[75] Inventors: Makoto Udaka; Kenji Umezu; Takasi Sekine; Tatsumo Yoshida, all of Yokosuka, Japan

[73] Assignee: Japan Nuclear Fuel Co., Ltd., Tokyo, Japan

[21] Appl. No.: 861,000

[22] Filed: May 8, 1986

[30] Foreign Application Priority Data

May 10, 1985 [JP] Japan .................................. 60-97873
Jun. 28, 1985 [JP] Japan ................................. 60-142221

[51] Int. Cl.⁴ .......................... B65B 1/30; G21C 19/00
[52] U.S. Cl. ....................................... 53/504; 53/148; 53/532; 53/542; 376/261; 29/723; 414/146
[58] Field of Search ................. 376/261, 260, 258; 29/723, 400 N, 700, 709, 711, 799; 414/146; 53/148, 504, 532, 542

[56] References Cited

U.S. PATENT DOCUMENTS 4,158,601  6/1979  Gerkey ................................ 376/261
4,235,066 11/1980  King et al. ........................... 29/723
4,495,146  1/1985  Gheri ................................. 376/261
4,566,835  1/1986  Raymond et al. ................... 376/261

FOREIGN PATENT DOCUMENTS 2900865  7/1979  Fed. Rep. of Germany ...... 376/261
2522436  9/1983  France ................................ 376/261
1004999  1/1986  Japan .................................. 376/261

Primary Examiner—Donald P. Walsh
Assistant Examiner—Daniel Wasil
Attorney, Agent, or Firm—Stevens, Davis, Miller & Mosher

[57] ABSTRACT

An apparatus for automatically loading one or more kinds of nuclear fuel pellets in fuel cladding tubes for producing nuclear fuel rods comprises at least one pellet transporting tray transferred from a tray stacking unit and provided with a plurality of grooves on which the fuel pellets are mounted, at least one pellet aligning tray provided with a groove selectively connected with one of the grooves of the pellet transporting tray at one end of the aligning tray, and a fuel cladding tube supporting device located in the vicinity of the other end of the aligning tray and adapted to support a number of fuel cladding tubes so that a selected one fuel cladding tube is operatively connected to the aligning tray. The fuel pellets are transferred from the transporting tray into the aligning tray by means of a pushing device and the row of the pellets transferred on the groove of the aligning tray is moved forwardly until it abuts against a stopping mechanism located in association with the aligning tray. The row of pellets is separated at the predetermined portion by a row length defining device so that the separated forward portion of the pellet row has a predetermined length including allowable common difference and then the separated pellet row is loaded into the cladding tube to produce the fuel rod. During these operations the weight of the fuel pellets to be loaded is properly measured.

28 Claims, 26 Drawing Sheets

FIG. 28
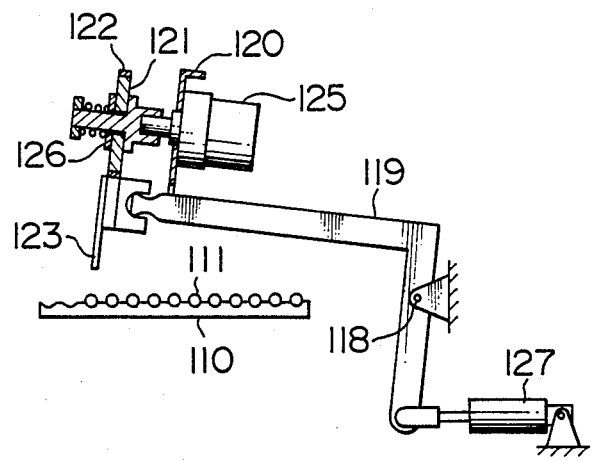
FIG. 29A  FIG. 29B  FIG. 29C  FIG. 29D
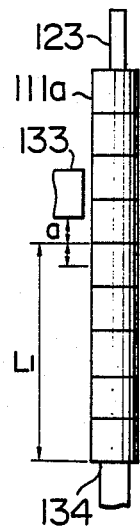 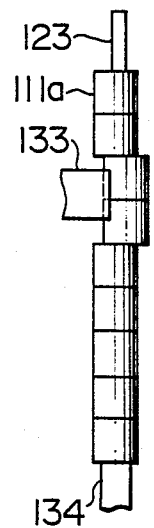 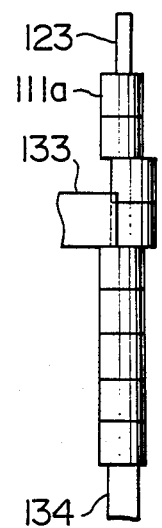 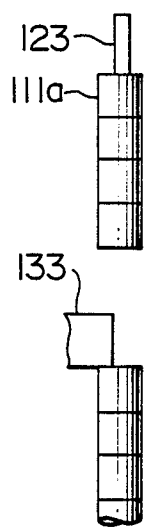

FIG.30A    FIG.30B    FIG.30C    FIG.30D
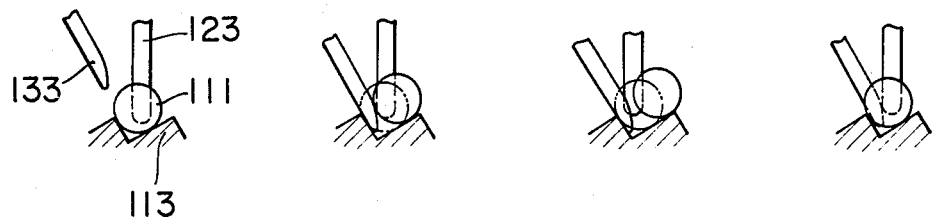
FIG. 31
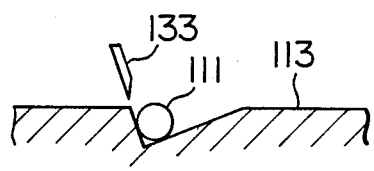
FIG. 32A     FIG. 32B
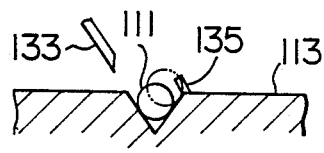    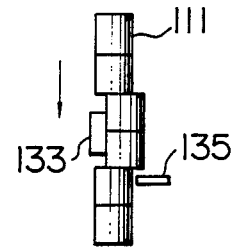

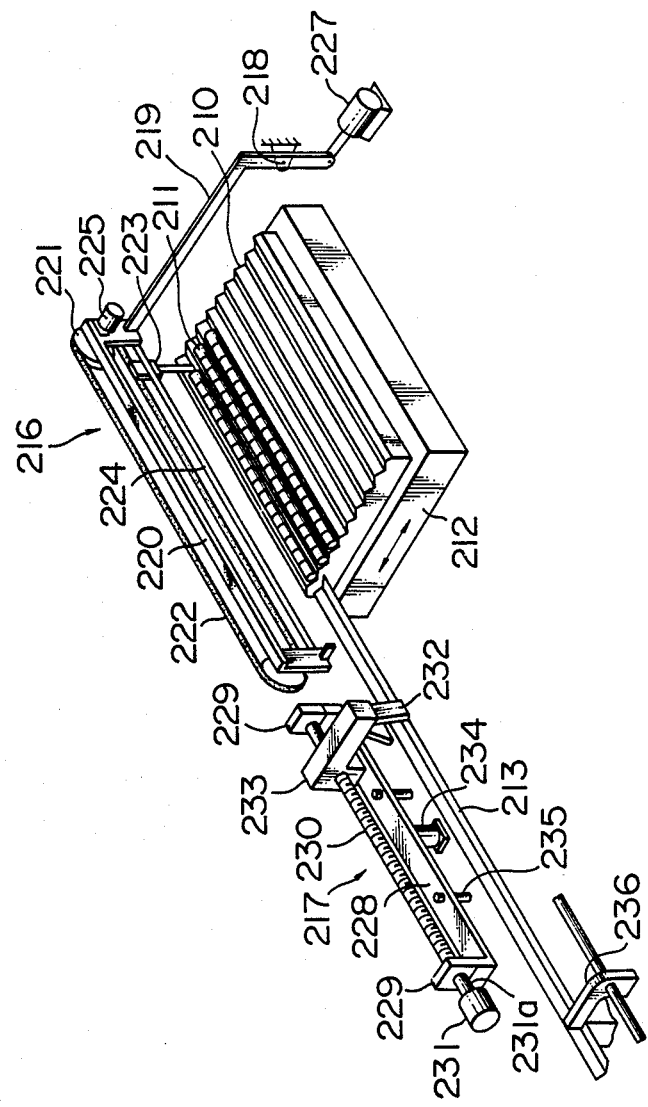

APPARATUS FOR AUTOMATICALLY LOADING NUCLEAR FUEL PELLETS

BACKGROUND OF THE INVENTION

This invention relates to an apparatus for loading a predetermined amount of columnar materials such as nuclear fuel pellets into a fuel rod cladding tube.

Generally, with the nuclear fuel rod used in a nuclear reactor, and particularly, with the fuel rod used in a boiling water reactor (BWR), a space in the fuel rod is divided axially into a plurality of areas or sections, and with respect to these sections, the nuclear fuel pellets containing $U_{235}$ of different enrichment, respectively, are loaded into fuel cladding tubes for the purposes of axially even distribution of the power output in BWR, shut-down margin of the reactor, an economical point of the fuel, and the like. For these purposes, in the prior art technique, there is proposed a fuel cladding tube having a plurality of sections into which the pellets having poison materials with densities different from each other are loaded. With a fuel rod in a pressurized water reactor (PWR), there is not observed unevenness in the axial direction of the power output in PWR dependent to void such as in the BWR, but a consideration will have to be paid on the economical point of the nuclear fuel. In addition, with a fast breeder reactor (FBR), the pellets have to be loaded into sections of a blanket portion and a fuel portion arranged in the axial direction of the cladding tube.

Moreover, in addition to the fact that a plurality of sections are located in one fuel rod, a length of a row of pellets to be loaded is generally different with respect to the types of the reactors, for example, only in case of the BWR.

In this connection, on the view point of a fuel fabrication process, in a case where the fuel rod only for the BWR is fabricated, the whole length of a row of the pellets to be loaded is different with respect to the respective types of the nuclear reactor, the designs of the respective section of the cladding tube in the axial direction are also different with respect to the types of the fuel rods to be used, and the kinds of the pellets to be loaded are also different with respect to the respective sections. In spite of the above facts, it is required to correctly load the pellets having substantially the same shapes respectively for the fuel rods of various types, and accordingly, a relatively long time is required for the fabrication of the nuclear fuel, which further results in the cost-up for the fuel fabrication, thus being not economical.

FIG. 1 shows a longitudinal section of a nuclear fuel rod of general type, in which a predetermined number of pellets 2 each essentially consisting of an uranium dioxide are loaded in a cladding tube 1 made of, for example, zirconium alloy or stainless steel and the pellets 2 are pressed at one end by spring means 3 towards the other end. At both the ends of the cladding tube 2 are welded end plugs 4 and 5, respectively. Accordingly, as shown in FIG. 2, two sections, i.e. section A, having a longitudinal length $L_1$, in which the pellets 2 are loaded and plenum section B, having a longitudinal length $L_2$, in which no pellet is loaded, are formed in the cladding tube 1 of the nuclear fuel rod. The plenum section B is designed to have a longitudinal length sufficient for storing or retaining a generated fission gas and the longitudinal length of the section A is determined in accordance with the length of the section B.

In order to arrange the fuel pellets axially in a row in the cladding tube so as to have a predetermined length, are generally known a method in which longitudinal lengths of the pellets are respectively measured and added or a method in which the pellets are manually aligned so as to have a length corresponding to a marking-off line which is preliminarily marked on a tray on which the pellets are disposed.

In the methods described above in which desired length of the pellets is measured, however, a length measuring working or operation is considerably troublesome, requires much time and may involve a relatively large cumulative error. Furthermore, in a case where the tray to which the marking-off line is applied is used, it will be required to prepare many kinds of trays in accordance with the kinds of the fuel rods and to selection necessary one of these trays as occasion demands. The necessity for manually adjusting or aligning the whole length of the respective lengths of the pellets also requires much time and labor.

In the other point of view, in which the pellet loading area A is divided into a plurality of sections in accordance with the kidns of pellets, the lengths of the respective section are generally prescribed in the manner described hereunder.

As shown in FIG. 3, for example, the area will be divided into five sections $A_1$ through $A_5$ having longitudinal lengths $l_1$, $(l_2-l_1)$, $(l_3-l_2)$, $(l_4-l_3)$ and $(L_1-l_4)$, respectively, and the plenum section B has the length $L_2$, or as shown in FIG. 4, the area will be divided into five section $A_1$ through $A_5$ having the longitudinal lengths $l_1$, $l_2'$, $l_3'$, $l_4'$ and $\{L_1-(l_1+l_2'+l_3'+l_4')\}$, respectively, and the plenum section has the length $L_2$.

With both the methods described above, the tolerances in the lengths of the respective sections $A_1$ through $A_4$ and the area A are set to be slightly longer than the length of one pellet so that the length of the pellet row will be ranged within the tolerance on the basis of the fact as to whether or not further one pellet should be added into the pellet row to be loaded.

In a case where it is desired to load the pellets into four sections of the fuel rod by a conventional method as shown in FIG. 5, plural kinds of fuel pellets 2Ba, 2b, 2c and 2d are arranged in an aligned manner in transporting trays 6, respectively, which are disposed in a row on a loading table 7 in accordance with the pellet loading order. The table 7 is provided with a V-shaped groove as a tray 8 on one longitudinal side thereof and the tray 8 is sectioned by a plurality of dividing members $a_1$, $a_2 a_3$, $a_4$ and $a_5$ designed in accordance with the fuel rod so that one row of pellets of the respective transporting trays 6 can be loaded in the corresponding sections of the tray 8 divided by the dividing members $a_1$, $a_2$, $a_3$, $a_4$ and $a_5$, and thereafter, the pellet row in the tray 8 is loaded into the fuel cladding tube 1. The fact, however, that these operations must be done by manual working or hand operation requires confirmation of the operator as to whether or not the same kinds of pellets or trays are always arranged and loaded on the predetermined positions without failure in addition to the confirmations of the kinds and the lengths of the pellets in the respective sections. This fact requires much time and labour, thus being not effective, and the increasing of the loading speed without taking any specific care will result in miss-loading of the pellets.

SUMMARY OF THE INVENTION

An object of this invention is to eliminate defects or disadvantages encountered in the prior art and to provide an apparatus for automatically loading columnar materials such as nuclear fuel pellets transferred from a transporting tray towards an aligning tray and then into a predetermined position such as a fuel rod cladding tube.

Another object of this invention is to provide a mechanism for smoothly transferring the columnar materials from the transporting tray towards the aligning tray or vice versa.

A further object of this invention is to provide an improved mechanism for forming or defining a row of nuclear fuel pellets on the aligning tray so as to have a predetermined length within the range of the common difference.

A still further object of this invention is to provide a fuel pellet clad handling unit provided with an improved weighing device for the fuel pellets to be loaded in the cladding tube.

According to this invention, these and other objects can be achieved by providing an apparatus for loading nuclear fuel pellets in a cladding tube for producing a nuclear fuel rod having a predetermined length of a pellet row, the apparatus comprising at least one pellet transporting tray provided with a plurality of grooves on which nuclear fuel pellets are mounted in plural rows, at least one pellet aligning tray provided with a groove which is selectively connected with one of the grooves of the transporting tray at one end of the pellet aligning tray, a cladding tube aligning device which is located in the vicinity of the other end of the aligning tray and which supports a number of cladding tubes so that a selected one cladding tube is operatively connected to the groove of the aligning tray in an aligning manner, a stopper mechanism located in association with the aligning tray to be movable in and out of the groove of the aligning tray for restricting the axial movement of the row of pellets in the groove of the aligning tray, a pellet row length defining device located in association with the aligning tray to separate the pellet row to have a predetermined length to be loaded into the cladding tube, and a mechanism for pushing the pellet row having a length defined by the pellet row length defining device so as to push the pellet row into the selected cladding tube. In addition, according to this invention, the weight of the fuel pellets to be loaded into one fuel cladding tube is measured by an improved device located in association with the fuel pellet cladding tube supporting device.

BRIEF DESCRIPTION OF THE DRAWINGS

In the accompanying drawings:

FIGS. 23 and 25 show side views of a part of another embodiment of the pushing mechanism according to this invention;

FIGS. 27 and 28 are schematic side views of the pushing mechanism for explaining the operation thereof;

FIGS. 29A through 29D are views for explaining the sequential operation for forming a row of the columnar materials;

FIGS. 30A through 30D are views also for explaining the row forming operation in connection with FIGS. 29A and 29D;

FIGS. 31, 32A, 32B, 33 and 34 are cross sectional views of the aligning tray and the pawl member for explaining several methods for forming a row of the columnar materials, respectively;

FIG. 39 is a view similar to the FIG. 26 showing the other modification of the columnar material row forming device;

DESCRIPTION OF THE PREFERRED EMBODIMENTS

Preferred embodiments of the invention will now be described with reference to FIGS. 6 through 25.

Figure 6:
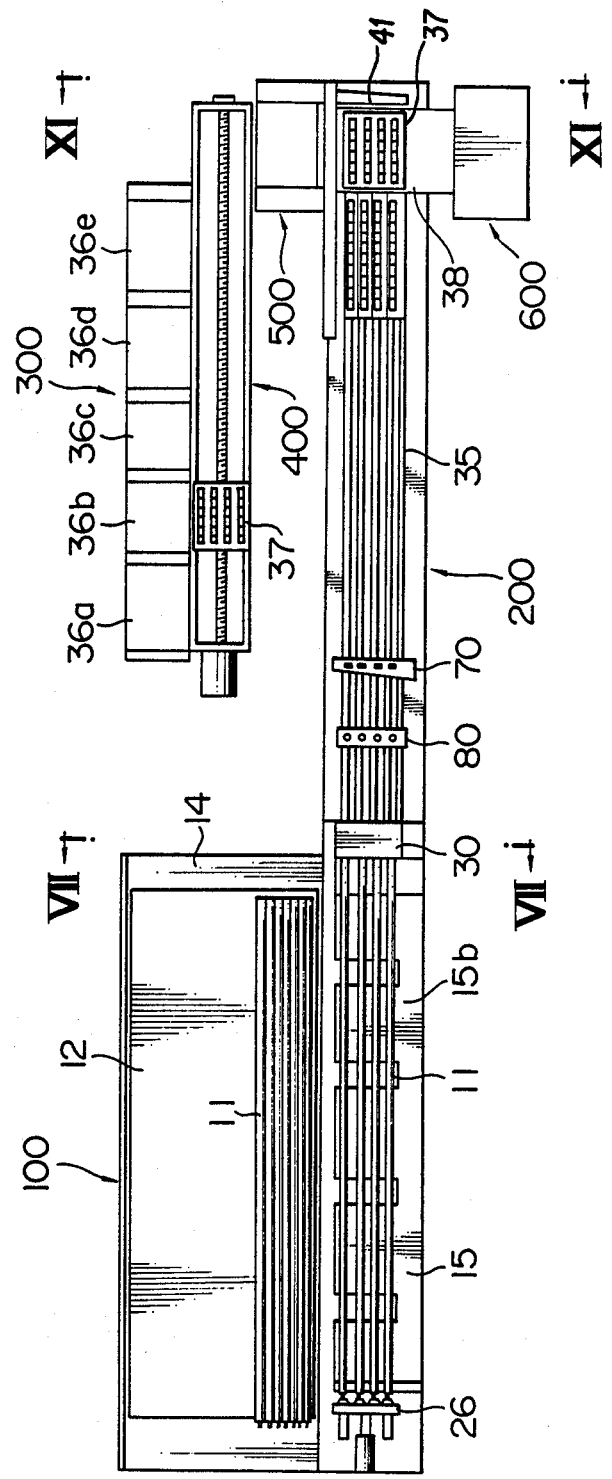
FIG. 6 is a plan view showing an apparatus for loading columnar nuclear fuel pellets according to this invention.
Figure 6A:
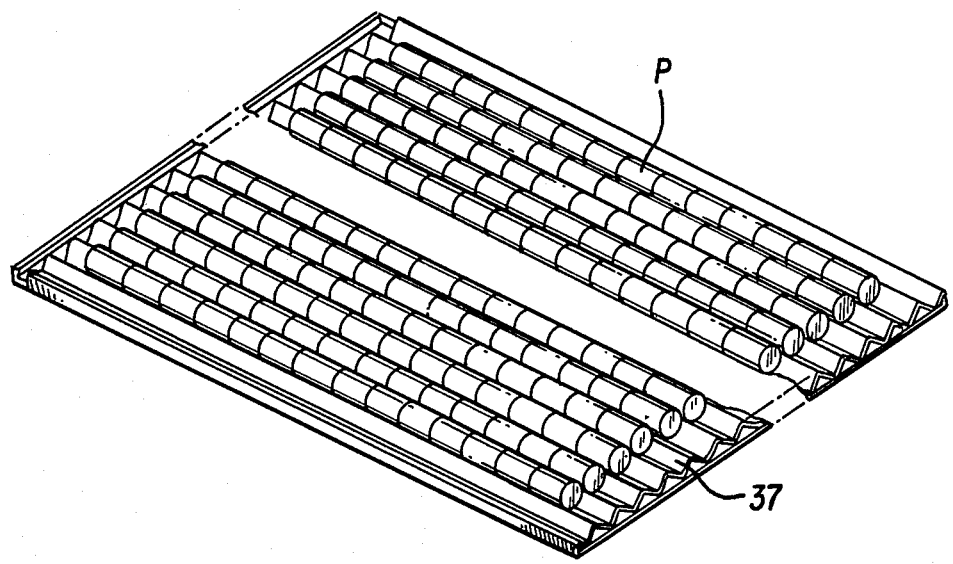
FIG. 6A shows a transport tray having parallel grooves.

FIG. 6 is a plan view of a nuclear fuel pellet loading apparatus according to the present invention. The apparatus comprises a cladding tube handling portion 100 in which cladding tubes with or without nuclear fuel pellets are stacked up at predetermined positions, a pellet handling portion 200 in which nuclear fuel pellets arranged in rows are loaded into cladding tubes, a tray stacker portion 300 in which pellet transporting trays are received, and a tray conveyor 400 which takes out and transports desired pellet transporting trays from the tray stacker portion 300. The apparatus further comprises an intermediate storage buffer 500 which stores a plurality of pellet transporting trays, and a vacant tray stacker 600 for storing the transporting trays which become vacant after supplying the nuclear fuel pellets out of the trays.

Figure 7:
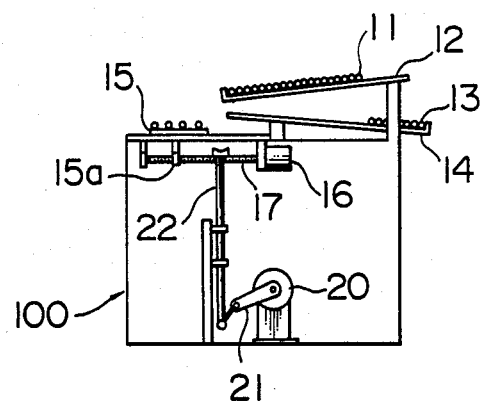
FIG. 7 shows a schematic side view taken along the line VII—VII shown in FIG. 6.
Figure 8:
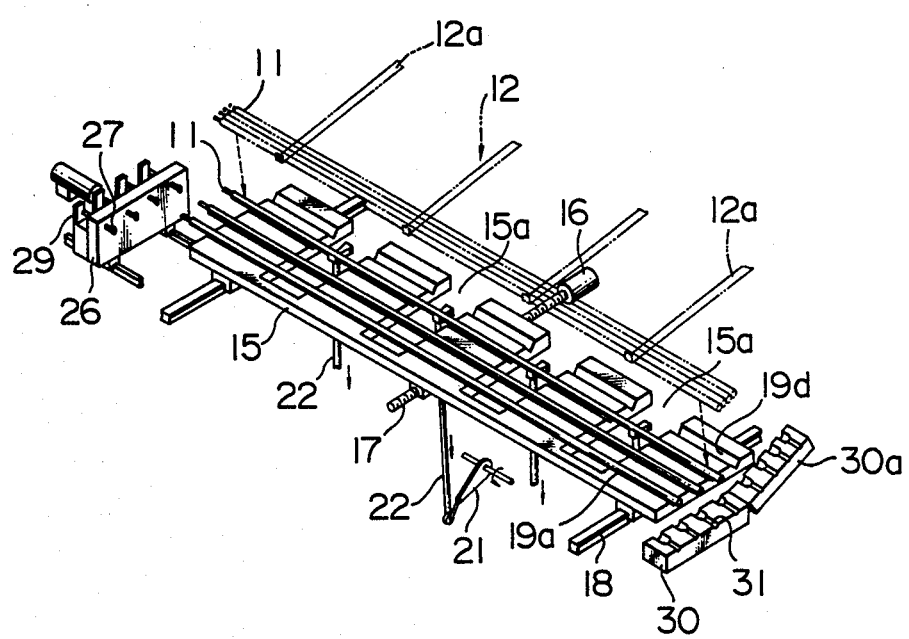
FIG. 8 is a perspective view showing a fuel cladding tube handling unit of the apparatus shown in FIG. 6.

As shown in FIGS. 7 and 8, the cladding tube handling portion 100 comprises a first stack table 12 on which a plurality of cladding tubes 11 are mounted. The first stack table 12 is made of a plurality of supporting levers 12a which are tapered downwardly in a direction perpendicular to the length of the cladding tubes 11 placed on the table 12. Under the first stack table 12 is provided a second stack table 14 which is tapered in a direction opposite to that of the supporting levers 12a and adapted to support cladding tubes 13 loaded with the pellets.

Along the downwardly tapered edge of the stack table 12, that is, in a direction perpendicular to the length of the supporting levers 12a, a pallet 15 is provided so as to be shiftable in a pitched manner toward or away form the stack tables 12 and 14. More specifically, a nut member 15a secured to the pallet 15 is caused to be engaged with a screw-threaded shaft 17 driven by a motor 16, and the pallet 15 is moved together with the nut member 15a along guide members 18 in the aforementioned direction. On the upper suface of the pallet 15, there are provided a plurality of V-shaped grooves 19a, 19b, 19c, ..., so that the cladding tubes 11 can be placed thereon in parallel with the length of the pallet 15.

Figure 9:
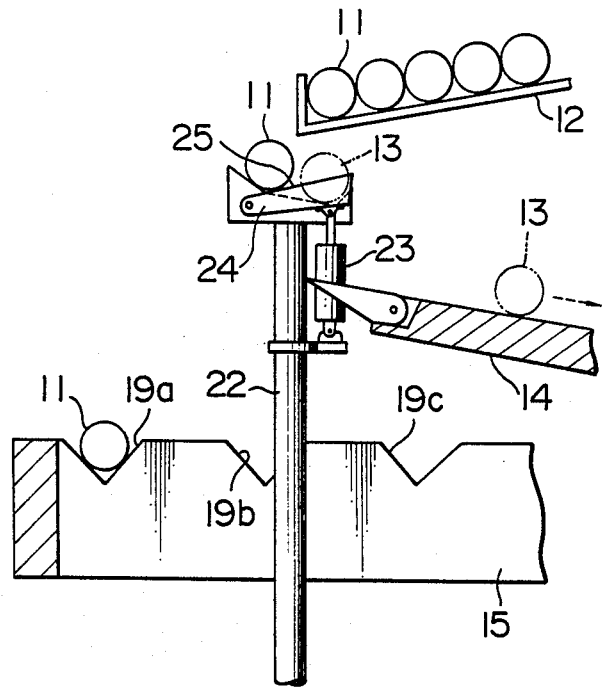
FIG. 9 shows an enlarged side view of a cladding tube handling portion of the unit shown in FIG. 8.

Downwardly of the pallet 15 are provided a plurality of vertical levers 22 in a spaced apart relation. The levers 22 are driven by a motor 20 through a link mechanism 21 and the like vertically and horizontally such that the upper end of each lever 22 goes up through a cut-away portion 15a of the pallet 15 and between the supporting levers 12a, to a position somewhat higher than the supporting levers 12a, and then moves forwardly (away from the stack table 12) and thereafter downwardly. As shown in FIG. 9, at an upper end of the vertical lever 22, an arm 24 is provided to be driven in a swinging manner by a driving device 23, so that the arm 24 is swung around a pivotal point in a vertical plane. At an uppermost swung position of the arm 24, a V-shaped recess 25 for supporting the cladding tube 11 is formed between the arm 24 and the upper end surface of the vertical lever 22.

Figure 10:
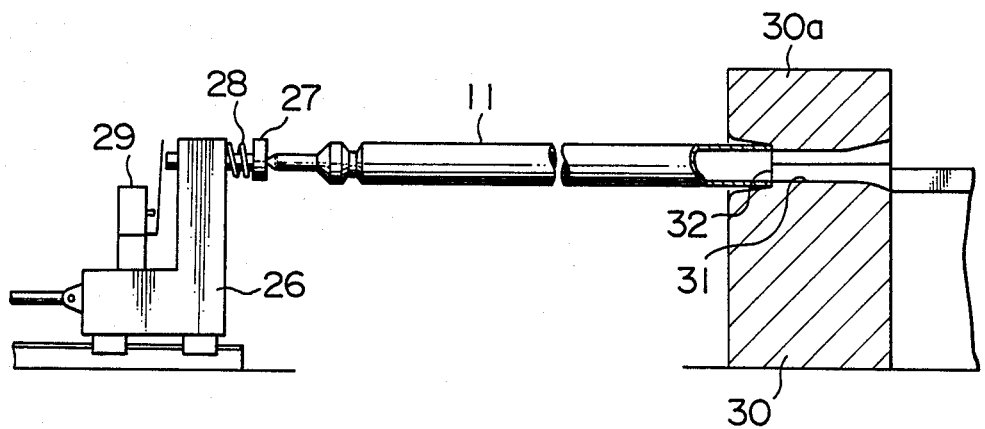
FIG. 10 is a front view showing a bushing of the cladding tube in connection with a centering device of the apparatus shown in FIG. 6.

Furthermore, at one end of the pallet 15, there is provided a cladding tube pusher 26 as shown in FIGS. 6 and 8 which is shiftable along the length of the pallet 15. As shown in FIG. 10, a plurality of pads 27 are provided in the cladding tube pusher 26. Each pad 27 is urged by a spring 28 so that it projects forwardly from the pusher 26. A limit switch 29 is further provided in the cladding tube pusher 26, so that when the pad retracts against the force of the spring 28, the limit switch 29 is operated by the pad 27 so as to stop the forward movement of the pusher 26.

On the other hand, at the other end of the pallet 15, a center-aligning device 30, into which the opening ends of the cladding tubes 11 supported by the pallet 15 are made insertable, is provided to be secured to the structure of the apparatus. More specifically, through holes 31 are formed through the center-aligning device 30 in alignment with the cladding tubes 11, and a step portion 32 engageable with the open end of the cladding tube 11 is formed at an intermediate portion of each through hole 31. The center-aligning device 30 is divided into the pieces by a plane passing through the center lines of the through holes 31, and the upper one 30a of the two pieces is made openable as shown in FIG. 8.

When one of the cladding tubes 11 placed on the stack table 12 is received in the V-shaped recess 25 formed between the upper end of each vertical lever 22 and the arm 24, the vertical levers 22 are shifted laterally (leftwardly as viewed in FIG. 9) and then downwardly, so that the cladding tube 11 is transferred from the stack table 12 to one of the V-shaped grooves, 19a, of the pallet 15. When the above described operation is repeated while shifting the pallet 15 laterally by one pitch, the next cladding tube 11 on the stack table 12 can be transferred from the table 12 to the subsequent V-shaped groove 19b of the pallet 15. When the cladding tubes 11 are thus transferred into the entire V-shaped grooves 19a–19d of the pallet 15, the cladding tube pusher 26 is shifted rightward as viewed in FIG. 8 so as to push the cladding tubes 11 toward the center aligning device 30. As a consequence, the opening ends of the cladding tubes 11 are inserted into the through holes 31 of the device 30, and all the tubes 11 are held at the aligned positions. In this case, if a load exceeding a predetermined value is applied to a pad 27, the pad 27 retracts against the force of the spring 28 and operates the limit switch 29. The operation of the limit switch 29 interrupts the rightward movement of the cladding tube pusher 26.

In the cladding tube handling portion 100, the cladding tubes 11 are thus automatically held in their predetermined positions adapted to be loaded with fuel pellets. After the pellets have been loaded, the closed ends of the cladding tubes 11 are seized by a gripper, not shown, provided on the cladding tube pusher 26, and pulled out of the center aligning device 30.

Figure 1:
FIG. 1 shows a logitudinal sectional view of a general nuclear fuel rod.
Figure 2:
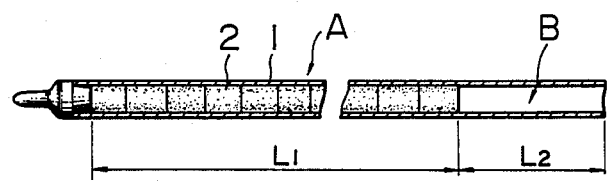
FIG. 2 shows a sectional view similar to that shown in FIG. 1 for showing a positional relationship between a nuclear fuel loaded area and a plenum area.
Figure 3:
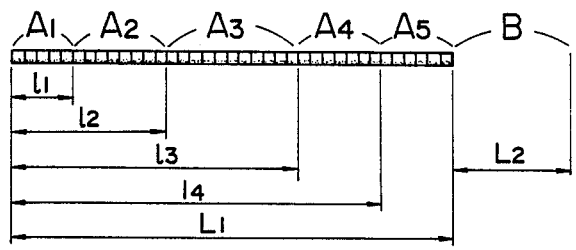
FIGS. 3 and 4 are views for explaining conventional methods each for prescribing the lengths of the sections of the fuel loaded area.

On the other side of the center aligning device 30, there is provided a pellet aligning tray 35 which is arranged in alignment with the pallet 15. On one lateral side of the tray 35 are provided a plurality of stackers 36a, 36b, 36c 36d and 36e of the tray stacker portion 300, each of which is constructed to store a plurality of trays mounting a different kind of pellets. For instance, the stacker 36a is adapted to accommodate a pellet transporting tray mounting fuel pellets to be loaded in the region $A_1$ of a cladding tube as shown in FIG. 3, while the stacker 36b is adapted to accommodate a pellet transporting tray mounting the pellets to be loaded in the region $A_2$ of the cladding tube and so forth.

Figure 11:
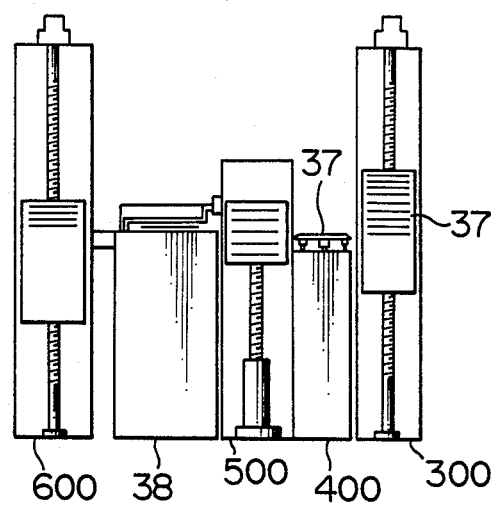
FIG. 11 shows a side view taken along the line XI—XI shown in FIG. 6.

Alongside of the stackers 36a-36e, there is provided a tray conveyor 400 for conveying a desired pellet transporting tray 37. Between the tray conveyor 400 and a pellet transfer portion 38 which is provided at an end of the pellet aligning tray 35, there is provided an intermediate storage buffer 500 as shown in FIG. 11, which can accommodate a plurality of pellet transporting trays 37. On one side (left side as viewed in FIG. 11) of the pellet aligning tray 38 opposite to the intermediate storage buffer 500, there is provided the vacant tray stacker 600 which stores vacant trays from which fuel pellets have been transferred to the pellet handling portion 200.

Figure 12:
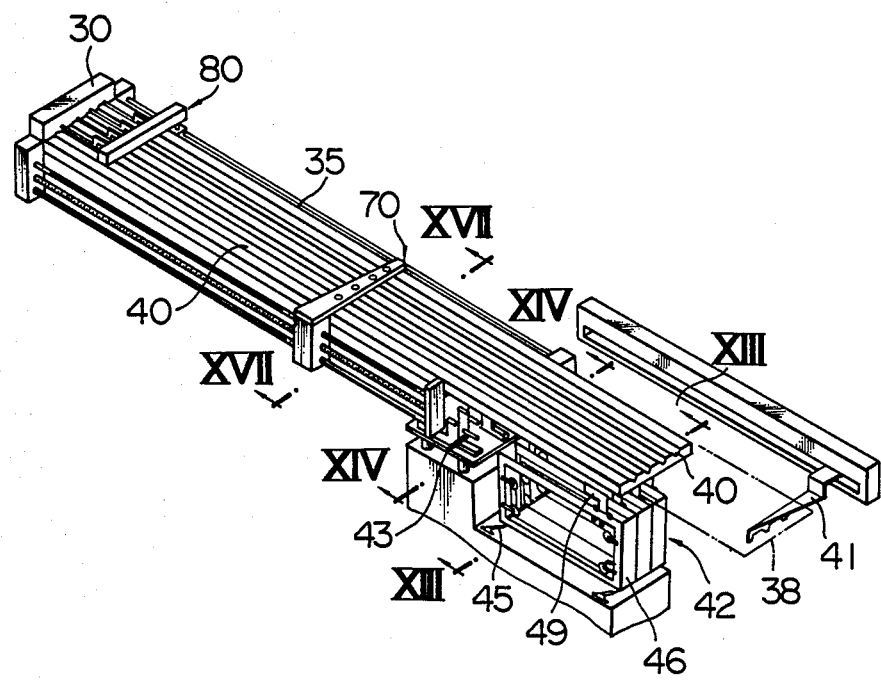
FIG. 12 is a perspective view of a pellet handling unit of the apparatus shown in FIG. 6.
Figure 13:
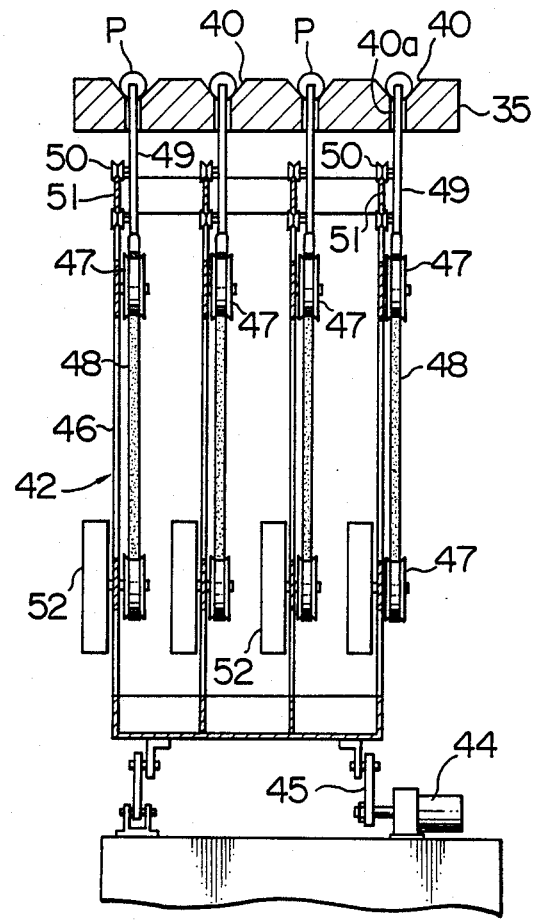
FIG. 13 shows a cross sectional view taken along the line XIII—XIII shown in FIG. 12.

As shown in FIG. 12, a plurality of V-shaped grooves 40 are formed on the surface of the pellet aligning tray 35, such that the grooves 40 extend in alignment with the cladding tubes 11 supported by the pallet 15. Above the pellet transfer portion 38, there is provided a pusher 41 which extends in a direction perpendicular to the rows of the pellets mounted on the pellet transporting tray conveyed to the pellet transfer portion 38. The pusher 41 abuts against the end surfaces of the rows of the pellets, and pushes the rows toward the V-shaped grooves 40.

Below the tray 35, there are provided a pellet pushing device 42 and a pellet row length defining mechanism 43 as shown in FIG. 12. The pushing device 42 includes a plurality of pushing members movable along the V-shaped grooves 40, and adapted to push fuel pellets placed in the grooves 40 in the axial direction toward a pellet separating position on the pellet aligning tray 35, while the pellet row-length defining mechanism 43 is so constructed that it can separate all the rows of the fuel pellets into a predetermined length. More specifically, the pellet pushing device 42 comprises a frame-shaped member 46 of a complex construction extending in the length of the V-groove tray 35, and supported by a link mechanism 45 which is driven by a driving device 44 as shown in a cross-sectional view in FIG. 13. The frame-shaped member 46 is movable upwardly and downwardly according to the swinging movement of the link mechanism 45. A plurality of sets of pulleys 47 are provided in the member 46, each set corresponding to one V-shaped groove 40 of the tray 35, and around each set of pulleys 47 is extended a belt 48. An elongated hole 40a is formed through the bottom wall of each groove 40, and an upper end of a pusher member 49 is inserted into the elongated hole 40a so as to be movable along the length of the groove 40 (see FIG. 13). One of each set of pulleys 47, around which the belt 48 is fixedly wound, is driven by a driving motor 52 through a clutch (not shown) which is disengaged when the load applied to the pulley 47 exceeds a predetermined value. According to the upward and downward movements of the frame-shaped member 46 caused by the pivotal movement of the link mechanism 45, the upper ends of the pusher members 49 may be brought into either one of two positions, one being projecting into the V-shaped grooves 40 of the tray 35 so as to engage one side ends of the fuel pellets P, and the other being located downward of the grooves 40 to be disengaged from the ends of the fuel pellets P.

Figure 14:
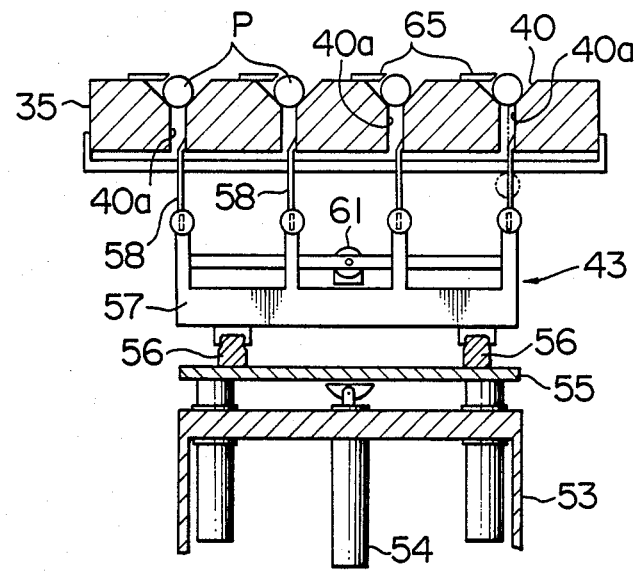
FIG. 14 shows a cross sectional view taken along the line XIV—XIV shown in FIG. 13.
Figure 15:
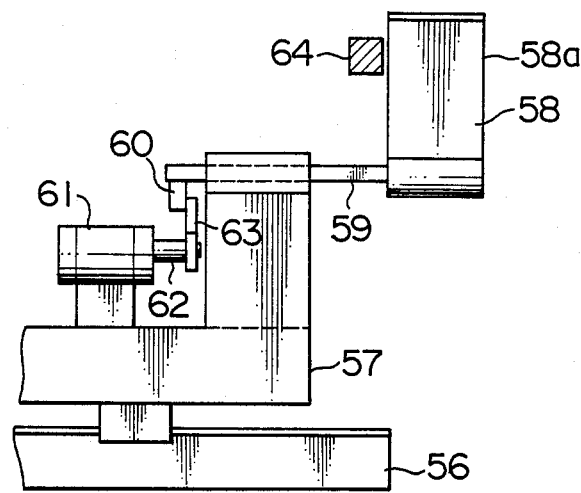
FIG. 15 is a front view showing a row length defining unit of the apparatus shown in FIG. 6.

The pellet row-length defining mechanism 43 shown in FIGS. 14 and 15 comprises a base plate 55 which can be moved vertically under the action of an air cylinder 54 secured to the structure 53 of the apparatus. A pair of guide rails 56 are provided on the base plate 55 so as to extend along the length of the pellet aligning tray 35. A frame member 57 is provided so that it is movable along the guide rails 56 under the action of a suitable driving mechanism (not shown). Through an upper portion of the frame member 57, separating levers 59 of a number equal to that of the V-shaped grooves 40 are extended horizontally so as to be slidable in parallel with the length of the grooves under a suitable amount of friction. A row length defining piece 48 is secured to each of the separating levers 59 in a manner such that the piece 58 extends upwardly through the aforementioned elongated hole 40a into the corresponding one of the V-shaped grooves 40. The piece 58 projects upwardly into the groove 40 along a path deflected toward one side of the groove 40 so that when the piece 58 is moved to the uppermost position as indicated by dash-line in FIG. 14, a fuel pellet P placed in the V-shaped groove 40 is laterally shifted toward the other side of the groove 40. Furthermore, a downward projecting member 60 is secured to the rear end (left end) of the separating lever 59 as viewed in FIG. 15. The member 60 is made engageable with an engaging piece 63 secured to a piston 62 of an air cylinder 61 provided on the frame member 57. Thus when the separating lever 59 and hence the row length defining piece 58 is shifted rearwardly by means of the air cylinder 61, the row length defining piece 58 abuts against a positioning bar 64 provided at a predetermined position, so that the position of the piece 58 is determined. Pellet stoppers 65 shown in FIG. 14 prevent the movement of the pellets P toward the pusher members 49 shown in FIG. 13 when the row length defining pieces 58 moved upward are shifted along the length of the grooves 40.

Figure 16:
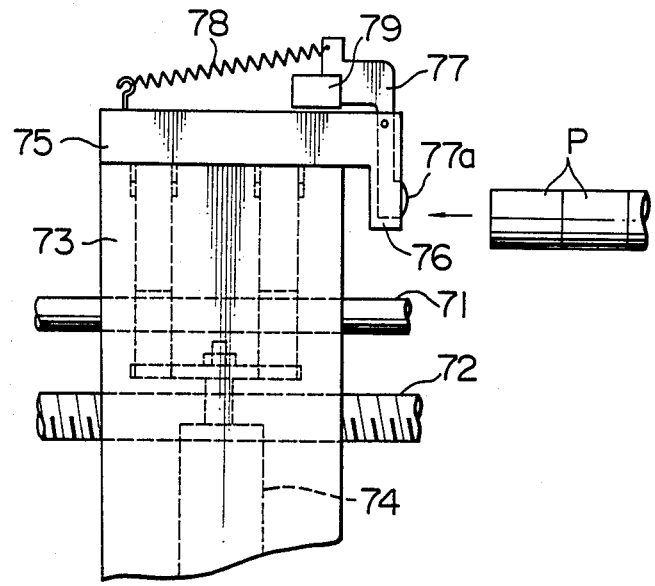
FIG. 16 is a front view of a stopping mechanism operated in association with the unit shown in FIG. 15.
Figure 17:
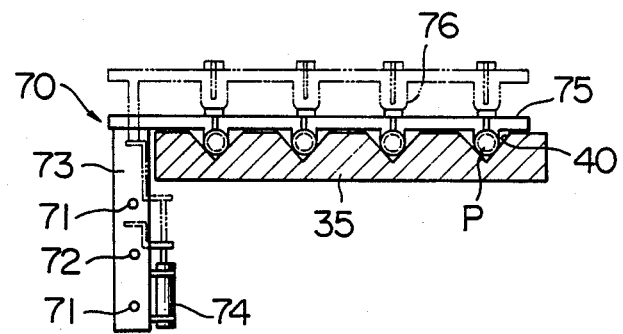
FIG. 17 is a cross sectional view taken along the line XVII—XVII shown in FIG. 12.

Upwardly of the pellet aligning tray 35, there is further provided a stopper device 70 as shown in FIG. 17. More specifically, on one side of the pellet aligning tray 35, there are provided guiding bars 71 and a screw-threaded shaft 72 extending along the length of the tray 35. A stopper position adjusting member 73 is made shiftable along the screw-threaded shaft 72. A stopper lever 75 extending in the transverse direction of the pellet aligning tray 35 is secured to the top of the stopper position adjusting member 73 as shown in FIGS. 16 and 17. The lever 75 is moved upwardly and downwardly by means of an air cylinder 74.

A plurality of stopper pieces 76 project downwardly from the stopper lever 75 so that when the stopper lever 75 moves downwardly, the stopper pieces 76 are inserted from upper positions into the V-shaped grooves 40 of the pellet aligning tray 35. At the downward position of the stopper pieces 76, the stopper pieces 76 abut against one-side ends of the pellets P aligned in the V-shaped grooves 40, and prohibit axial movements of the pellets P. On the stopper lever 75 is pivotally provided a swingable member 77 of an inverted L-shape, and a detecting chip 77a contactable with the end of the pellet P is provided at the lower end of the swingable member 77. A spring 78 is provided to urge the swingable member 77 in a direction to project the detecting chip 77a thereof from the surface of the stopper piece 76. A photosensor 79 is provided on the upper surface of the stopper lever 75, so that when the swingable member 77 is swung against the force of the spring 78 by the pellet P, the photosensor 79 confirms the swinging movement and interrupts the movement of the pusher member 49 of the pellet pushing device 42.

Upwardly of the pellet aligning tray 35, there is further provided a pellet loading pusher 80 which is operable to push the pellets placed in a plurality of rows in the V-shaped grooves 40 of the pellet aligning tray 35 toward the cladding tubes arranged on the pallet 15, so that the pellets are loaded in the cladding tubes, respectively.

Figure 18:
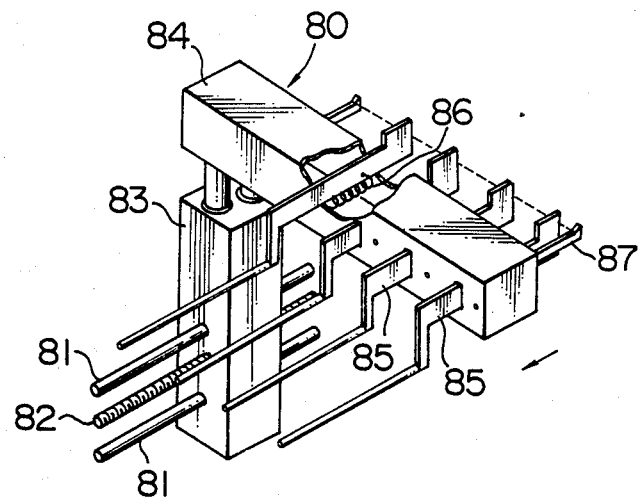
FIG. 18 is a perspective view showing a pushing mechanism for loading a row of nuclear fuel pellets.
Figure 19:
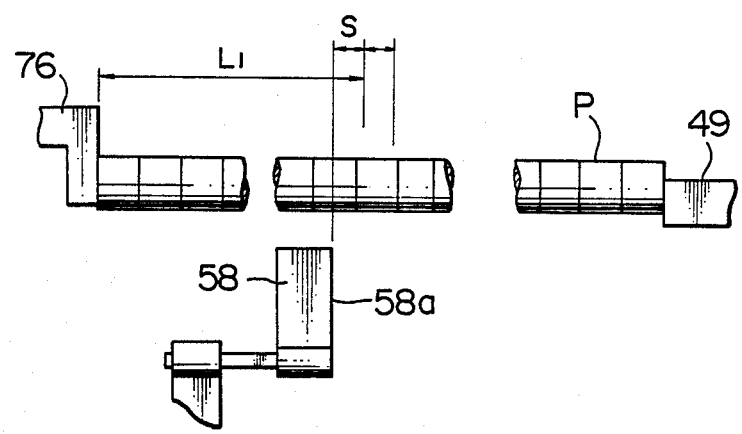
FIGS. 19 through 22 are sequential views for explaining the row defining operation based on the row length defining unit shown in FIG. 15.

The loading pusher 80 comprises a movable member 83 movable relative to the pellet aligning tray 35 along the length thereof by means of guide bars 81 and a feed screw 82 as shown in FIG. 18. The pusher 80 further comprises a pusher supporting member 84 which extends in the transverse direction above the aligning tray 35 and secured to the upper end of the movable member 83 so as to be movable relative to the movable member 83. Pushing levers 85 of a number corresponding to that of the V-shaped grooves 40 are provided to pass through the pusher supporting member 84 such that the pushing levers 85 are movable relative to the supporting member 84 in the axial direction of the V-shaped grooves 40. Each pushing lever 85 is urged by a spring 86 toward the loading direction of the fuel pellets. On the rearside of the pusher supporting member 84 is provided a sensor 87 which detects the rearward movement of any one of the pushing levers 85 against the force of the spring 86 and interrupts the lengthwise movement of the moveable member 83.

The pellet loading apparatus constituting the preferred embodiment, which is constructed as described above operates as follows.

Firstly, the type number of fuel rods to be produced are supplied to a control portion not shown. The control portion selects desired pellets from a table indicating pellets of various kinds, region lengths and stack lengths, based on the memorized type of the fuel rods, and assigns the desired kinds of pellets to the stackers. The kinds of the pellets thus assigned are indicated on a monitor.

Based on the indication on the monitor, the operator of the apparatus sends out trays mounting the indicated kinds of pellets into the stackers 36a, 36b, . . . to be accommodated therein. For instance when different kinds of pellets are to be loaded in five regions $A_1$ through $A_5$ of the cladding tube as shown in FIG. 3, the fuel pellets to be loaded in the region $A_1$ are thus prepared in the stacker 36a, fuel pellets to be loaded n the region $A_2$ are thus prepared in the stacker 36b, and so forth.

Thus when a row of pellets to be loaded in the region $A_1$ is to be formed, a transporting tray 37 stored in the stacker 36a is pulled out onto a carrier on the tray conveyor 400 to be sent into the intermediate storage buffer 500. The tray 37 is then pulled to into the pellet transfer portion 38.

Then the rows of the fuel pellets mounted on the tray 37 are transferred by means of the pusher 41 into the V-shaped grooves 40 of the pellet aligning tray 35. At the same time, stopper pieces 76 are shifted to predetermined positions corresponding to the length of the row of the pellets to be loaded into the region $A_1$, according to the movement of the stopper position adjusting member 73 of the stopper device 70, and are inserted into the V-shaped grooves 40 of the pellet aligning tray 35.

When the fuel pellets are pushed by the pusher device 41 into the V-shaped grooves 40, the frame member 46 of the pusher device 42 is moved upward by the link mechanism 45 until the pusher members 49 of the pusher deivce 42 are inserted into the V-shaped grooves 40. When the pusher members 49 are shifted toward the stopper pieces 76 by means of the belts 48, the pusher members 49 push the fuel pellets along the V-shaped grooves 40 toward the stopper pieces 76. When the pusher members 49 are shifted toward the stopper pieces 76 for a predetermined distance, the frame member 46 of the pusher device 42 is shifted downward, and the pusher members 49 are returned to the intial positions to be ready for the subsequent operation. The above described pellet transfer operation and the pellet pushing operation are repeated until a condition is reached where the leading ends of the pellets abut against the stopper pieces 76, the gaps between respective pellets are reduced to a negligible extent, and the entire length of the rows of pellets inclusive of allowable error is made longer than a predetermined value. More specifically, when a transporting tray 37 brought into the pellet transfer portion 38 becomes vacant, the tray 37 is sent to the vacant tray stacker 600, and another transporting tray 37 is sent from the intermediate storage buffer 500 to the pellet transfer portion 38. The pellets mounted on another transporting tray 37 is transferred as described above into the V-shaped grooves 40 of the pellet aligning tray 35. The leading ends of rows of the pellets placed in the V-shaped grooves 40 abut against the detecting chips 77a of the stopper pieces 76 and rotate the swingable members 77 against the forces of the springs 78. When the entire swingable members 77 are rotated, the photosensor 79 detecting the rotation interrupts the movements of the pusher members 49. At this time, each row of pellets placed in the V-shaped groove 40 of the tray 35 is brought into a state supported between the pusher member 49 and the stopper piece 76 (see FIG. 19). Since the driving force of each pusher member 49 is transmitted thereto through a slip-clutch, even in a case where a pusher member 49 pushes a pellet row to its limited length, pushing operations of remaining pusher members 49 can be carried out without any disturbance.

On the other hand, the forward end edge 58a of the length defining piece 58 of the pellet row-length defining mechanism 43 is set to a position corresponding to a minimum allowable length of the row of pellets, that is, to a length obtained by subtracting an allowance from the predetermind length of the row of pellets. For this purpose, the frame member 57 of the mechanism 43 is moved to a predetermined position along the rails 56, and the engaging piece 63 brought into engagement with the member 60 of the separating lever 59 is shifted rearwardly under the action of the air cylinder 61 until the rear edge 58b of the length defining piece 58 abuts against the positioning bar 64 (see FIG. 15).

Figure 20:
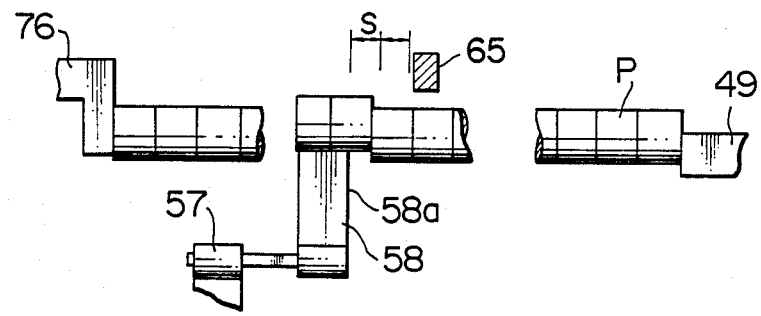

In a state where each row of the pellets is held between the stopper piece 76 and the pusher member 49 as described above, the row-length defining pieces 58 are inserted under the action of the air cylinder 54 (see FIG. 14) into the V-shaped grooves 40 of the pellet aligning tray 35. At this time, fuel pellets contacting with the upper surface of the row-length defining piece are pushed up as shown in FIG. 20.

Figure 21:
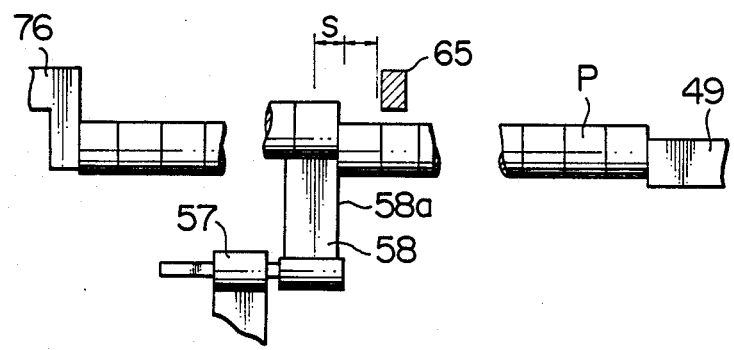

Thereafter the frame member 57 supporting the row length defining pieces 58 is shifted toward the pusher members 49 by a distance a little longer than the allowable error. At this time, since the separating lever 59 supporting the row length defining piece 58 is made slidable relative to the frame member 57 under a frictional force, the forward edge 58a of the piece 58 engages with an end surface of one of the pellets provided in the error ranges as shown in FIG. 21. The frictional force between the separating lever 59 and the frame member 57 is so selected that it can shift the row length defining piece 58, the upper surface of which is slidably contacting with the pellets, toward the pusher member 49 but is lower than the braking force of the pusher member 49.

Figure 22:
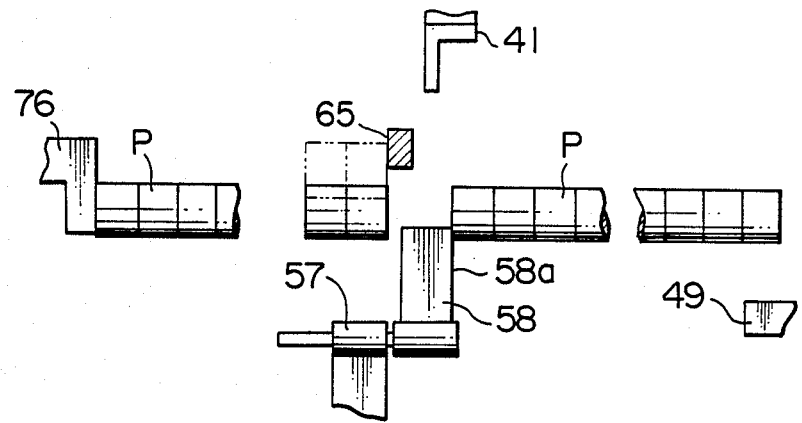

Then the frame-shaped member 46 of the pellet pusher device 42 is lowered so as to shift the pusher members 49 downwardly out of the V-shaped grooves 40 of the pellet aligning tray 35, and the rows of the pellets, each starting from a pellet caught by the forward edge of the piece 58 and ending at a pellet pushed by the pusher member, are shifted by the pieces 58 toward the pusher device 42 (see FIG. 22). In this case, since the pellets riding on the upper surface of the row length defining pieces 58 are displaced from their central positions of the V-shaped grooves 40 as indicated by dotted lines in FIG. 14, the pellets are seized by the pellet stoppers 65 regardless of the movement of the pieces 58 toward the pusher device 42, so that the movement of the pellets riding on the pieces 58 toward the pusher members 49 together with the rows of the pellets are thereby prohibited.

Then the pusher 41 held above the tray 35 is shifted to a position opposing to the row length defining pieces 58 as shown in FIG. 22, and then lowered and shifted toward the pusher members 49, so that the rows of the pellets which have been caught by the row length defining pieces 58 and shifted toward the pusher members 49 are further shifted by the pusher 41 rearwardly and finally received in a transporting tray to be transported as excessive pellets.

When the rows of pellets to be loaded in the region $A_1$ of the cladding tubes are thus formed, the stopper device 70 is displaced to a predetermined position, corresponding to the sum of the lengths of the pellets to be loaded in the regions $A_1$ and $A_2$, by means of the stopper position adjusting member 73. Then the fuel pellets to be loaded in the region $A_2$ are transferred from the pellet transporting tray onto the pellet aligning tray 35 in the similar manner as described above, and the rows of the pellets to be loaded in the regions $A_1$ and $A_2$ are formed in the V-shaped trays 40 as described above. The rows of pellets to be loaded in the regions $A_3$, $A_4$ and $A_5$ are also produced by repeating the above described operations.

When the entire rows of the pellets to be loaded in all the regions $A_1$ to $A_5$ are thus formed, the stopper pieces 76 are lifted upward, and the loading pusher 80 is shifted to the rear ends of the rows of the pellets where the forward ends of the pushing lever 85 are held in abutment with the rear ends of the rows of the pellets. According to the operation of the pusher 80, the rows of the pellets formed as described above are pushed by the pushing levers 85 into the cladding tubes 11 arranged on the pallet 15 until the rows of the pellets are loaded in the cladding tubes 11 entirely. When the resistance forces applied to the pusher levers 85 are thereby increased and the pusher levers 85 are retracted against the force of the spring 86, the sensor 87 detects the retraction and terminates the movement of the loading pusher 80 toward the pellet loading position. The loading pusher 80 is then retracted for a predetermined distance for preventing the pellets or the pellet loading apparatus from being damaged by excessive loading forces applied thereto.

Upon completion of the loading operation of the fuel pellets into the cladding tubes 11, the upper portion 30a of the center aligning device 30 is opened, and the pallet 15 is shifted toward the stack table 12 so that one of the cladding tubes supported on the pallet 15 is brought into an upper position of the vertical lever 22. According to an upward movement of the vertical lever 22, the cladding tube is brought up by the lever 22 to a position higher than the second stack table 14. Then, by a downward movement of the arm 24, the cladding tube 11 is transferred from the vertical lever 22 onto the second stack table 14. Then, the pallet 15 is shifted toward the stack table 12 one pitch after another, so that the cladding tubes 11 loaded with the fuel pellets are transferred onto the second stack table 14 successively.

Figure 4:
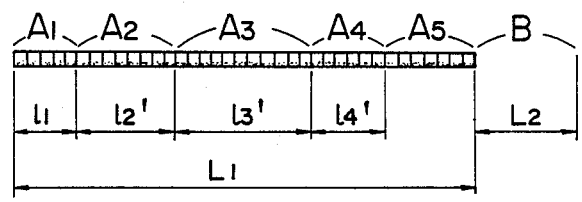
Figure 5:
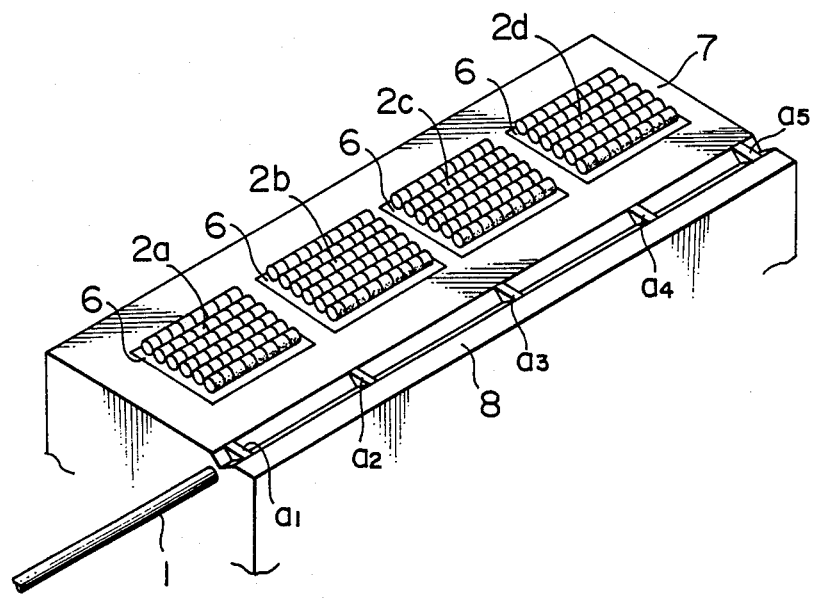
FIG. 5 shows a schematic perspective view of a conventional pellet loading device.

On the other hand when rows of pellets arranged as shown in FIG. 4 are to be formed, the stopper pieces 76 of the stopper device 70 are lifted upward each time when rows of pellets for one region are formed as described above, and the stopper pieces 76 are then shifted to a separating position where the rows of pallets corresponding to one region are brought to one side of the stopper pieces 76 nearer to the cladding tubes 11. In this manner, the length of each row of pellets corresponding to one region can be brought into a predetermined value, and only when the rows of pellets corresponding to the last region $A_5$ are to be formed, the rows of pellets are formed according to the method described hereinbefore.

Figure 23:
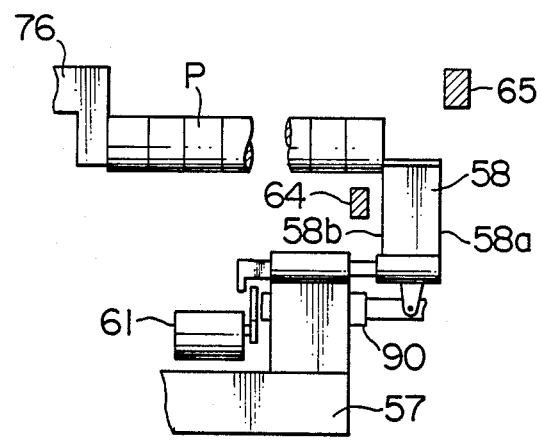
FIG. 23 shows a front view of another embodiment of the row length defining unit.

In case where the length of the row of pellets to be inserted in one region is required to be measured, a measuring device 90 may be provided as shown in FIG. 23, for measuring the distance between the rear edge 58b of the row-length defining piece 58 and the frame member 57 of the row-length defining mechanism. After the formation of the row corresponding to the region, the frame member 57 of the mechanism 43 is retracted to the original position while maintaining the defining piece 58 in its upper position, until the rearward edge 58b of the piece 58 abuts against the mating end of the row of pellets. Since the distance between the original position of the frame member 57 and the stopper pieces 76 is known, the length of the row of pellets to be measured can be calculated from the measured valve in the measured device 90.

In a case where the forming capability of the forming apparatus is not required to be so high, a pellet aligning tray having a single V-shaped groove may be provided in the apparatus, and the transporting tray in the intermediate storage buffer may be manually stored in each position of the buffer.

Figure 24:
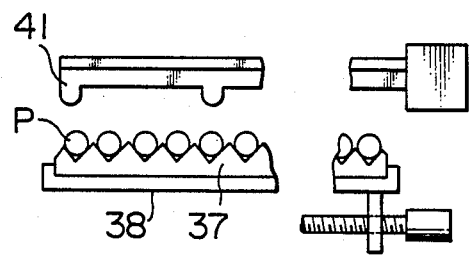
Figure 25:
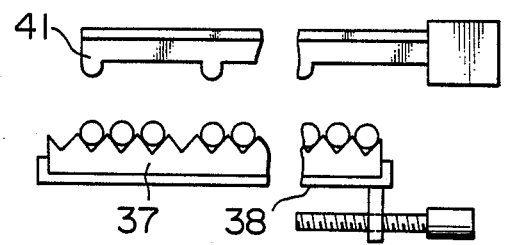

FIGS. 24 and 25 illustrate an example wherein 20 rows of pellets of substantially equal lengths are supplied on a transporting tray 37, and are transferred from the tray 37 to a pellet aligning tray 35 having four V-shaped grooves 40. The four V-shaped grooves 40 are provided in axial alignment with every fifth groove of the transporting tray 37, and the pusher 41 is constructed to push only those rows of pellets supplied on the transporting tray 37 axially aligning with the four V-shaped grooves 40 on the aligning tray 35. In case where the rows of pellets are arranged in the entire grooves of the transporting tray as shown in FIG. 24, a first set of rows in the first, fifth, tenth, ... grooves of the transporting tray 37, counter from the left end as viewed in FIG. 24, are firstly pushed into the four V-shaped grooves 40 of the tray 35, and then the tray 37 is shifted by one pitch to leftward as shown in FIG. 25, so that the next set of rows of pallets are thereafter pushed into the V-shaped grooves 40 in the similar manner.

When pellets still remain in the grooves of the transporting tray, the tray is returned to be stored in the storage buffer. Although it is not illustrated, a control device is provided to be operable in a manner such that it memorizes the positions of the remaining rows of pellets on the tray 37, and when the tray 37 is again utilized for supplying pellets, it is placed at a position where the remaining rows of pellets are brought into alignment with the V-shaped grooves 40 of the pellet aligning tray 35.

Although an example having four V-shaped grooves on the tray 35 and 20 rows of pellets on the transporting tray 37 has been described, it is apparent that the V-shaped grooves 40 of 20 rows may be provided on the pellet aligning tray 35, or in a special case, a single V-shaped groove may be provided on the tray 35. In case where the number of the grooves on the transporting tray 37 is so selected that it is integer multiple of the number of V-shaped grooves 40 on the pellet aligning tray 35, the actual numbers of the grooves on the two trays 35 and 37 may be selected to those different from the numbers described above.

Furthermore, instead of the stopper device 70 movable along the pellet aligning tray 35, a plurality of stoppers may otherwise be provided fixedly, and any of the stoppers may be utilized in a selective manner.

In the foregoing descriptions with reference to FIGS. 6 through 25, although there is disclosed a preferred embodiment of an apparatus for loading nuclear fuel pellets according to this invention, alternations or modifications of the essential parts, particularly the columnar material row formation mechanism, of the apparatus will be disclosed hereinbelow as preferred embodiments or example of this invention in conjunction with the accompanying drawings.

Figure 26:
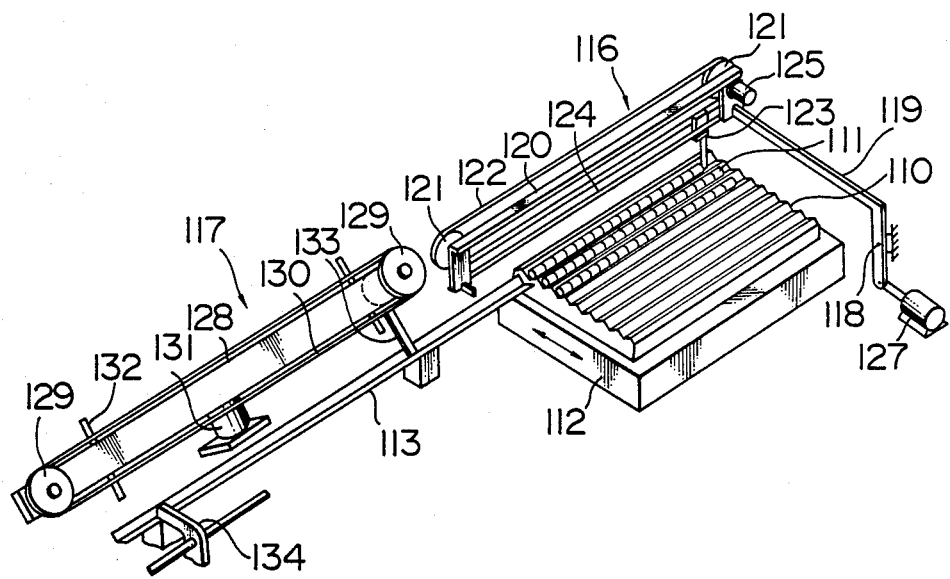
FIG. 26 shows a perspective view of a columnar material row forming device which is modified embodiment of the pellet handling unit shown in FIG. 12.

Referring to FIG. 26, columnar materials 111 such as nuclear fuel pellets are arranged in plural rows on a transporting or transporting tray 110, which is rested on a tray support board 112 being movable in a direction normal to the axial direction of the row of the columnar materials 111.

An aligning tray 113 having substantially the V-shaped cross section, i.e. having a V-shaped groove, is located in front of the tray support board 112 so that the axis of the V-shaped tray 113 accords with the axis of corresponding one of rows of the columnar materials 111 in the transporting tray 110 in accordance with the movement of the tray support board 112. In the following, it will be of course understood that the alternation of the columnar material to the nuclear fuel pellets involves no problem.

At the upper portion on one side of the tray support board 112, is located a pushing device or mechanism 116 to be movable in a direction parallel to the rows of the columnar materials 111 on the tray 110 for pushing the columnar materials in the axial direction thereby to transfer the materials 111 on the aligning tray 113. On the one side of the aligning tray 113 is also located a mechanism for cutting the columnar materials 111 transfered on the tray 113 so as to form a row of columnar materials having the predetermined length. The pushing device 116 is provided with a frame 120 secured to the front end of an L-shaped support lever 119 pivoted by a pin 118 and extending in a direction parallel to the longitudinal direction of the columnar materials 111 on the transporting tray 110. Pulleys 121 are disposed at both the longitudinal end portions of the frame 120 and a belt 122 is stretched around the pulleys 121. To the belt 111 is attached the top end of a pushing rod 123 extending downwardly and slidably engaged with a guide rod 124 attached to the frame in parallel to the row of the columnar materials 111 so that the pushing rod 123 is moved in the longitudinal direction along the guide rod 124 in accordance with the movement of the belt 122.

Figure 27:
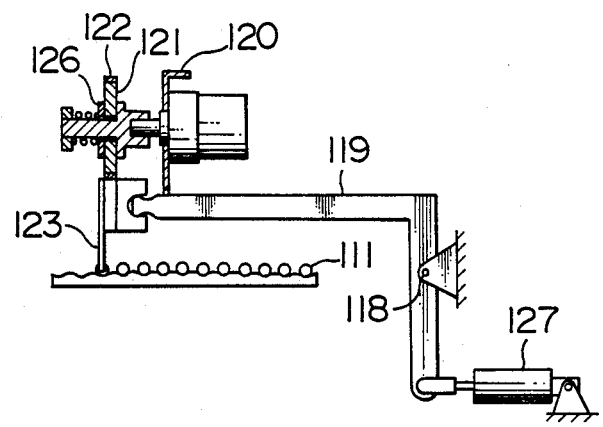

The pulley 121 is constructed so as to be driven by a driving motor 125 mounted on the frame 120, and a slip clutch 126 is coupled to a power transmission shaft between the driving motor 126 and the pulley 121 as shown in FIG. 27 so that the movement of the pulley 121 is stopped when a load more than the predetermined amount is applied to the pulley 121 even when the motor 125 is driven. An air cylinder 127 is connected to the other, i.e. rear, end of the L-shaped support lever 119 to swing the lever 119 about the pivot pin 118 so that the pushing rod 123 takes a lower position, as shown in FIG. 27, at which the lower end of the rod 123 is engaged with the end of the columnar materials 111 and an upper position, as shown in FIG. 28, at which the lower end of the rod 123 are released from the engagement with the columnar materials 111.

The row length defining mechanism 117 described hereinbefore is provided with a frame 128 located along the alignment tray 113 and provided at both the ends with pulleys 129 around which a belt 130 is stretched. One of the pulleys 129 is operatively connected to a driving motor through a slip clutch, not shown, so that the movement of the pulley 129 is stopped when a load more than the predetermined amount is applied to the pulleys even when the driving motor is driven. The frame 128 is designed so as to be movable vertically in a plane parallel to one inclined surface of the V-shaped aligning tray 113 by the operations of an air cylinder 131 and a guide rod 132. A projecting pawl member 133 to be inserted into the V-shaped tray 113 along the aforementioned one inclined inner surface of the tray 113 is attached to the belt 130 for forming the length of the columnar materials 111, and a stopping member which is movable in the axial direction of the V-shaped tray 113 so as to be inserted into the groove thereof is located in the vicinity of the rear end of the V-shaped tray 113.

The formation of the columnar materials so as to have a predetermined length will be performed by the manner described hereunder in use of the mechanism and devices referred to hereinbefore.

The air cylinder 127 is first operated to swingably move the support rod 119 thereby to move the pushing rod 123 to the lowered portion in contact with the rear end of the row of the columnar materials disposed on the most lefthand side on the transporting tray 110 as shown in FIGS. 26 and 27. The motor 125 is then driven to forwardly move the pushing rod 123 through the operation of the pulleys 121 and the belt 122 and the pushing rod 123 pushes one row of the columnar materials 111 and transfers the same on the aligning tray 13.

When the first row of the columnar materials is thus transferred, the pushing rod 123 returns to the original position, and at the same time, the transporting tray 110 is moved by one pitch leftwardly as viewed in FIG. 26 by the movement of the support board 112 on which the tray 110 is rested. Thereafter, the second row of the columnar materials is transferred to the aligning tray 113 by substantially the same manner as described above. This transferring operation is repeated until the front end of the first row of the transferred columnar materials abuts against the stopping member 134, i.e. until teh slip clutch 126 is idly driven. When the front end of the columnar materials abuts against the stopping member 134, the row of the columnar materials 111 is under the condition interposed between the stopping member 134 and the pushing rod 123 such as shown in FIG. 29A or FIG. 30A, and under this condition, when the columnar materials such as nuclear fuel pellets having usually different length, respectively, the end position of the columnar materials will be positioned at an optional position within the range of the tolerance of the longitudinal length of the row of the columnar materials. In a case where the range of the tolerance is longer than the length of the row of the columnar materials, however at least one end portion of the columnar material exists in this range of the tolerance. The front end of the row length definition pawl member 133 is arranged at a portion apart from the stopping member 134 by the maximum distance of the sum of the predetermined length $L_1$ of the row of the columnar materials to be formed and the tolerance a. When the front end of the row of the columnar materials abuts against the stopping member 134, the frame 128 of the length formation or defining mechanism 117 is lowered and the pawl member 133 is also lowered from the obliquely upper portion along the side wall of the aligning tray 113. According to this manner, the columnar materials on the tray 113 are pushed rightwardly obliquely as shown in FIG. 29B or FIG. 30B.

In the next step, the row length definition pawl member 133 is moved towards the stopping member 134 along the aligning tray 113 through the operation of the pulleys 129 and the belt 130 and contacts the rear end surface of the columnar materials contacting the columnar materials pushed upwardly by the pawl member 133 as shown in FIG. 29C. The rotation of the pulleys 129 is then stopped by the operation of the slip clutch thereby to stop the movement of the pawl member 133. Under this condition, a row of columnar materials, i.e. nuclear fuel pellets, having a predetermined length within the range of the tolerance is clamped between the stopping member 134 and the pawl member 133. The stopping member 134 is then moved upwardly to release the clamped condition of the pellets, and the pawl member 133 is again moved forwardly to push the fuel pellets having the predetermined length into the fuel cladding tube, for example. By the way, in order to prevent the columnar materials pushed obliquely upwardly by the pawl member 133 in the V-shaped tray 113 from moving towards the stopping member 134 together with the pawl member 133, it may be possible to design the V-shaped tray 113 so that the friction force of the oblique surface of the V-shaped tray 113 on which the columnar materials are pushed by the pawl member 133 is made larger than that of the other oblique surface by changing the inclination angles of these oblique surfaces, respectively, as shown in FIG. 31. In an alternation, the difference in the friction force will be caused by using an aligning tray made of stainless steel and a hard chrome plated pawl member without providing the difference in the inclination angles of both the oblique surfaces of the V-shaped tray.

Figure 33:
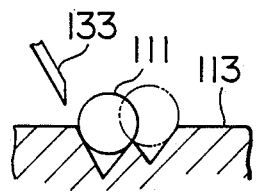

FIGS. 32A and 32B show one modification, in which a member 135 is located so as to project from one side surface of the V-shaped aligning tray 113 for preventing the columnar materials pushed upwardly by the pawl member 133 from moving in the axial direction together with the pawl member 133 when it moves. In another modification as shown in FIG. 33, the unwilling movement of the columnar materials pushed upwardly by the pawl member 133 is prevented by providing, for the tray 113, a groove in which the columnar materials are movable in the axial direction and a groove which is engageable with the columnar materials shifted by the pawl member 133.

Figure 34:
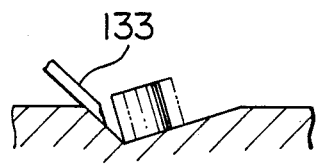
Figure 35:
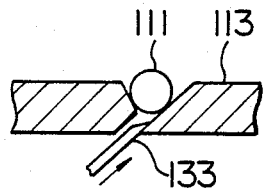
FIGS. 35, 36 and 37 show cross sectional views of the aligning tray and the pawl member representing other alternations of the row formation mechanism, respectively.
Figure 36:
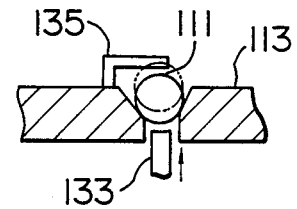
Figure 37:
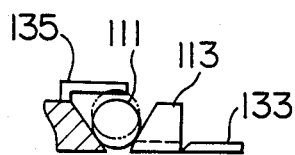
Figure 38A:
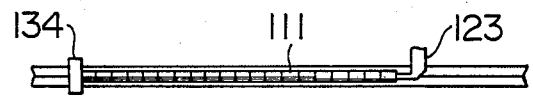
FIGS. 38A through 38E are sequential views of the aligning tray and the row forming member for explaining another embodiment for forming a row of the columnar materials.
Figure 38B:
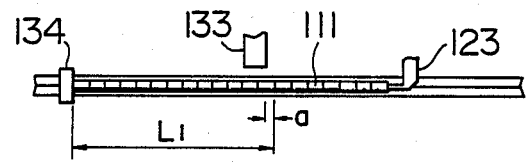
Figure 38C:
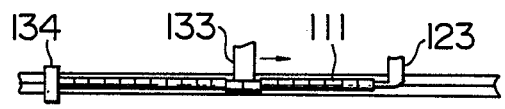
Figure 38D:
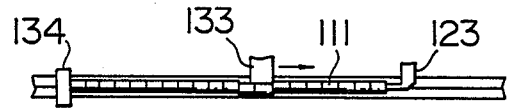
Figure 38E:

In the foregoing embodiment or modification thereof, columnar materials each having substantially the circular cross section is treated, but columnar materials each having a square or rectangular cross section may be also treated such as shown in FIG. 34, and moreover, although the row length definition pawl member 133 is lowered in the V-shaped tray 113 along the side wall thereof from the obliquely upper position, the pawl member may be inserted into a bottomless groove of the V-shaped tray 113 from an obliquely lower position, a downward position or a side position thereof as shown in FIGS. 35, 36 and 37, respectively.

Moreover, in the other embodiment of this invention, as shown in FIGS. 38A through 38E, a row of the columnar materials having a predetermined length is formed by moving the pawl member 133 in a direction reverse to the direction towards the stopping member 134. Namely, in this embodiment, the edge of the front end of the pawl member 133, opposing to the stopping member 134, the pawl member 133 is designed so as to be inserted into the V-shaped aligning tray 113 at a position apart from the stopping member 134 by the minimum distance, i.e. the distance $(L_1-a)$. Furthermore, it may be possible to design the alignment tray 113 to be movable horizontally by one pitch in place of the transporting tray 110 on the tray board 112, and the provision of the plurality of alignment trays may be considered so as to align with the grooves on the transporting tray, respectively, thereby to form plural rows of the columnar materials such as nuclear fuel pellets.

FIG. 39 shows a perspective view of a pushing device 216 and a row length formation or definition mechanism 217, in which the pushing device 216 is substantially the same as that 116 shown in FIG. 26 and elements or members in the pushing device or mechanism 216 are designated by adding "100" to the reference numerals added to the corresponding members shown in FIG. 26, and for example, the transporting tray 110 in FIG. 26 corresponds to the transporting tray 210 in FIG. 39.

Referring to FIG. 39, the row length formation mechanism 217 is provided with a frame 228 disposed along an aligning tray 213, and a lead screw 230 is supported by bearings 229 disposed at both longitudinal ends of the frame 228. The lead screw 230 is operatively coupled with a driving shaft 231a of a driving motor 231 arranged concentrically with the lead screw 230 on the outside of one of the bearings 229, and the lead screw 230 is constructed to be axially movable. A movable member 233 is mounted on the front portion, on the side of the transporting tray 210, of the lead screw 230 and the movable member 233 is provided with a gripper 232 having pawl members 232a which clamp the columnar materials on the aligning tray 213 on both sides thereof by the operation of an air cylinder, not shown. The frame 228 is vertically movable as viewed in the drawing by an air cylinder 234 through guide rods 235.

A stopping member 236 substantially identical to the member 134 shown in FIG. 26 is arranged near the rear end portion of the aligning tray 213 to be movable in the axial direction thereof.

Figure 40A:
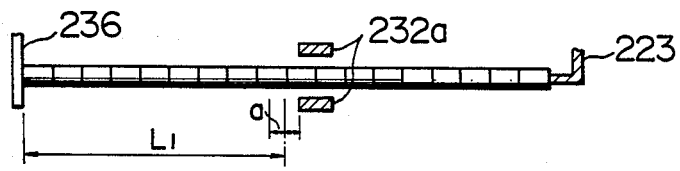
FIGS. 40A through 40F are sequential views for explaining the other modified embodiment of the columnar material row formation with the predetermined length.
Figure 40B:
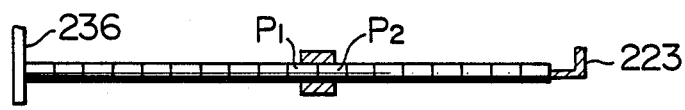

The formation of the row of the columnar materials in the aligning tray 213 is started and performed by substantially the same manner as described with reference to the former embodiment in conjunction with FIGS. 26 through 28. During the columnar material row formation process, when the front end of the columnar materials 211 pushed into the V-shaped tray 213 abuts against the stopping member 236, the materials 211 are clamped between the pushing rod 223 and the stopping member 236 on the tray 213 as shown in FIG. 40A. In a case where columnar materials having different lengths respectively such as nuclear fuel pellets are treated, the end portion of the columnar materials can take an optional position within the range of the tolerance of the row length of the columnar materials. On the other hand, in a case where the range of the tolerance of the row length is longer than the row length, at least one end position of the columnar materials will exist in the range of this common difference. The gripper 232 is located so that the edge portion thereof is positioned apart from the stopping member 236 by the maximum distance $(L_1+a)$ ($L_1$: predetermined length of the row of columnar materials and a: tolerance), and when the front end of the columnar materials abuts against the stopping member 236, the frame 228 of the row length formation mechanism 217 is lowered together with the gripper 232 attached thereto along both the side surfaces of the columnar materials 211 on the tray 213. Upon the completion of the lowering of the frame 228, the columnar materials are clamped as shown in FIG. 40B or FIG. 41.

Figure 40C:
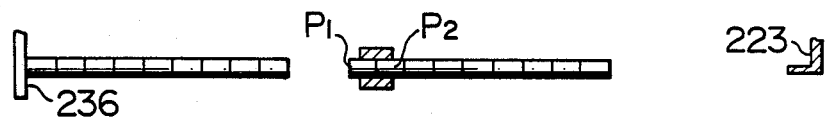

In the next step, the pushing rod 223 is moved upwardly from the groove of the transporting tray 210 to the original position to release the clamped condition of the columnar materials, and thereafter, the gripper 232 is slightly moved upwardly together with the gripped columnar materials and then is moved towards the transporting tray 210 as shown in FIG. 40C, whereby the row of the columnar materials with one end supported by the stopping member 236 is formed so as to have the predetermined row length.

Figure 40D:
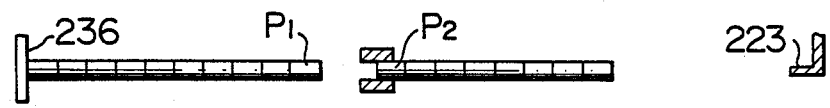
Figure 40E:
Figure 40F:
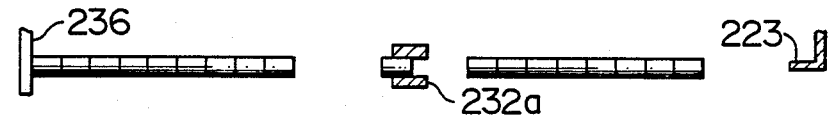

In the foregoing embodiment, although an example in which the gripper 232 can grip two columnar materials $P_1$ and $P_2$ having substantially the same diameters is disclosed, in a case where the gripper 232 grips only the columnar material $P_2$ on the side of the pushing rod 223 because the diameter of the material $P_2$ is larger than that of the material $P_1$, the material $P_1$ is not gripped and left on the tray 213 as shown in FIG. 40D. In this case, the gripper 232 is again returned to grip and convey the material $P_1$ by the same manner as shown in FIGS. 40E and 40F.

Figure 41:
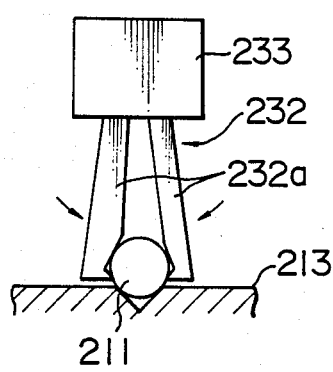
FIGS. 41, 42, 43 and 44 are brief cross sectional views of the aligning tray and the pawl member for showing alternations or modifications of the columnar mateial row formation mechanism respectively.
Figure 42:
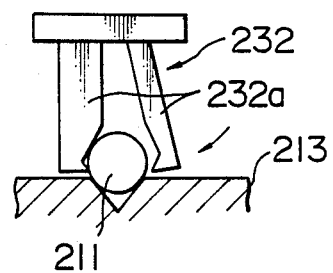
Figure 43:
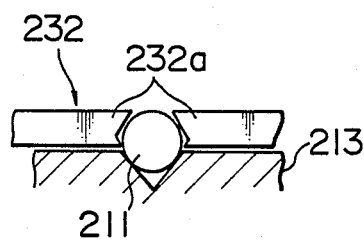
Figure 44:
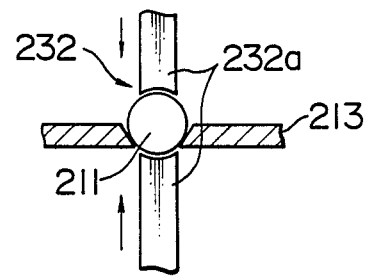

In the above embodiment, although the columnar materials are gripped equally by a pair of bilateral pawl members 232a as shown in FIG. 41, only one of the pawls may be operated as shown in FIG. 42, and otherwise, the pawl members 232a will be constructed to extend horizontally and to be movable in the bilateral direction as shown in FIG. 43. In an alternation as shown in FIG. 44, the columnar material 211 will be gripped vertically.

Figure 45A:
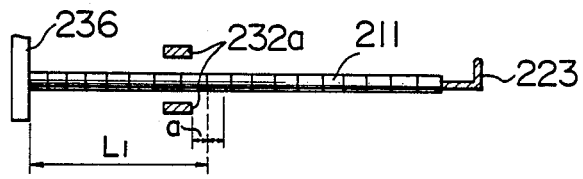
FIGS. 45A through 45C are sequential views for explaining the view formation operation based on the other modification of this invention.
Figure 45B:
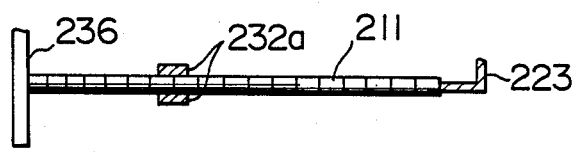
Figure 45C:
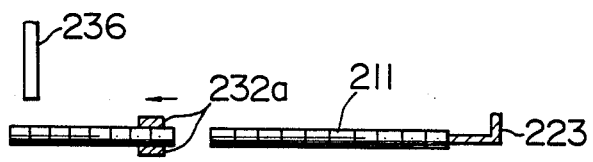

The row of the columnar materials will be formed by a manner as shown in FIGS. 45A through 45C, other than the manner shown in FIGS. 40A through 40F, in which the gripper 232 grips the columnar materials at a position in which the edge portion of the gripper on the side of the stopping member is positioned apart from the stopping member 236 by the minimum distance $(L_1-a)$ ($L_1$: predetermined length of the columnar materials and a: tolerance). It will be also be understood that alternations or modifications of the aligning tray 213 will be able to be made by substantially the same manner as described hereinbefore with respect to the aligning tray 113.

With the embodiments described hereinbefore, although the disclosure was developed in the assumption that the columnar materials 111 (211) located in the groove of the transporting tray 110 (210) are smoothly transferred into the aligning V-shaped tray 113 (213), in a practical operation, there may often exist a differnece in levels of the front end fo the groove of the transporting tray 110 (210) and the rear end, contacting to the front end of the transporting tray, of the aligning tray 113 (213). In case the rear end of the aligning tray is positioned at a level higher than that of the front end of the transporting tray, the columnar materials may be damaged or the movement thereof may be obstructed, and in the reverse condition, there is a fear of falling down the columnar materials at the connecting point of the grooves of the aligning tray and the transporting tray. Moreover, there was no conventional method or technique to eliminate these problems which can be applied to a case in which the columnar materials are moved from and towards the transporting tray towards and from the aligning tray in one operation. In addition, if a plurality of aligning trays are utilized, these problems will be further complicated.

Figure 46:
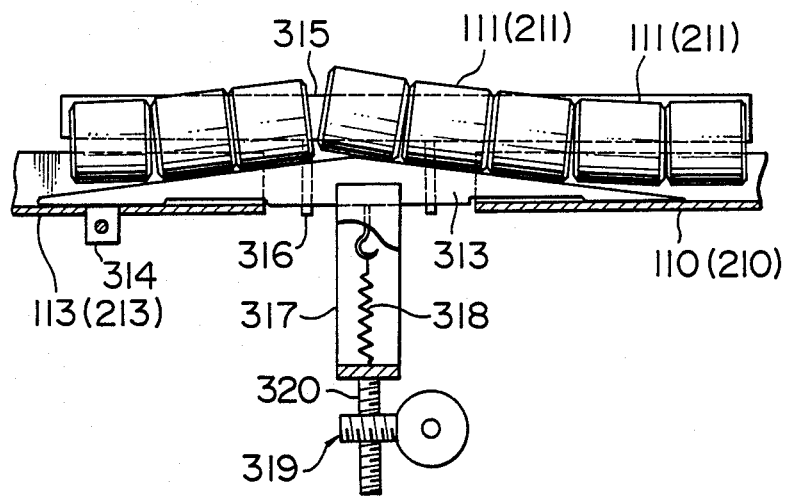
FIG. 46 shows a side view showing a connecting portion between transporting and aligning trays in use of a specific jig according to one embodiment of this invention.
Figure 47:
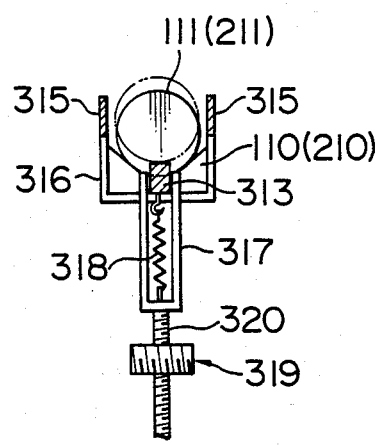
FIG. 47 shows a cross sectional view of the jig shown in FIG. 46.

In order to obviate these problems, the invention provides a device or mechanism briefly illustrated in FIG. 46, in which the front end of the transporting tray 110 (210) is located with a predetermined space from the rear end of the aligning tray 113 (213) to align the axes of these trays on one axial line.

A columnar material supporting rail 313 is located near the rear end of the aligning tray 13 (213) facing the front end of the transporting tray 110 (210) so that one end of the rail 313 is positioned on the former tray to be pivotable about a horizontal pin 314 and the other end thereof is on the latter tray and that the supporting rail 313 is folded at substantially the central portion to form downward slopes therefrom both the trays 113 (213) and 110 (210). To both upper side portions of the columnar material supporting rail 313 are connected through a coupling member 316 side plates 315 extending therealong for guiding both sides of the row of the columnar materials, i.e. nuclear fuel pellets 111 (211) as shown in FIG. 46. The columnar material support rail 313 is mounted on a substantially U-shaped support member 317 to be vertically movable and a draft spring 318 is interposed between the support rail 313 and the support member 317. The suport member 317 is connected to a shaft 320 to be vertically movable through a drive mechanism 319, such as screw member engageable with the shaft 320.

According to the construction described herein above, when it is required to transfer the columnar materials 111 (211) from the transporting tray 110 (210) onto the aligning tray 113 (213), the tray 113 is disposed so that the V-shaped groove of the tray 113 substantially aligns with the V-shaped groove of the conveying tray 110 and the support member 317 is lowreed by the operation of the drive mechanism 319 to thereby rotate the support rail 313 about the pivot pin 314. Thus, the free end of the support rail 313 is pressed or tightly contacted on the V-shaped groove of the transporting tray 110. Under these conditions, when the nuclear fuel pellets 111 (211) on the transporting tray 110 (210) is pushed by the pushing rod 123 (223) towards the aligning tray 113 (213), the columnar pellets 111 are guided along the guide plates 315 and moved upwardly along the inclined surface of the support rail 313 and then downwardly therealong from substantially the central portion thereof, thus being transferred into the V-shaped groove of the aligning tray 113. Accordingly, the pellets 111 can be smoothly transferred from the transporting tray 110 to the aligning tray 113 by using the support rail 313 regardless of the existence of the level difference between the connected ends of both the trays 110 and 113.

Figure 48:
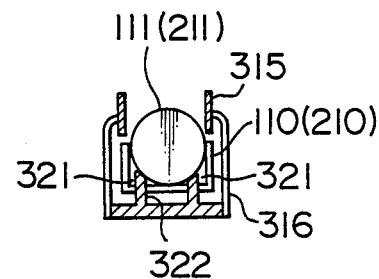
FIG. 48 shows a view similar to FIG. 47 showing another example of the jig of this invention.

In the above embodiment, although one example in which the columnar materials are transferred between the trays having V-shaped grooves, respectively, is described, in one modification, the columnar materials can be transferred between the trays each having a U-shaped groove according to this invention as shown in FIG. 48. In this modification, the front end of a columnar material support rail 313 may be inserted into spaces 321 formed between the columnar material 111 (211) and both the trays 110 (210) and 113 (213).

Figure 49:
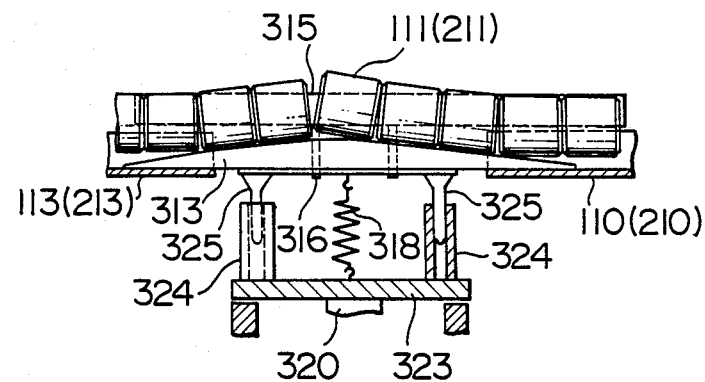
FIG. 49 shows a view similar to FIG. 46 showing a further example of the jig of this invention.

As shown in FIG. 49, in an alternation of FIG. 48, the support rails 313 may be disposed independently with respect to both the trays 110 and 113 without being pivoted at one end of the support rail 313. In this alternation, two cylindrical guide members 324 are vertically disposed on a support member 323 of the support rail 313 at positions below and along the longitudinally extending support rail 313, and guide rods 325 project downwardly from the lower surface of the rail 313 at positions independent from the trays 110 and 113 and have lower ends to be inserted into the upper end openings of the cylindrical guide members 324, respectively, so as to be vertically movable and somewhat swingable in the other directions. A draft spring 318 is interposed between the support rail 313 and the support member 323.

With the arrangement described above, when both the end portions of the columnar material support rail 313 are disposed on the grooves of the trays 110 and 113 aligning on substantially the same axial line and the support member 323 is moved downwardly, the end portions of the rail 313 are pressed on the grooves of the trays by the action of the draft spring 318 to thereby operatively connect the corresponding end portions of the transporting tray 110 and the aligning tray 113 so as to smoothly transfer the fuel pellets 111 thereon through the support rail 313. Moreover, in this example, even if the axes of both the trays 110 and 113 are somewhat offset with each other, the engagement between these trays will be surely maintained by the relative movement between the guide rods 325 and the guide members 324.

Although, in the foregoing example of the supporting rail 313, both the ends of the rail 313 were referred to so as to have shapes mainly engaging with the V-shaped groove of the aligning tray, the shape of the end portion of the rail 313 may be changed so as to engage with the shape of the groove of the aligning tray.

As described hereinbefore, according to this invention, the lengths of the rows of the nuclear fuel pellets to be loaded into the respective areas or sections in the fuel cladding tube can be automatically defined with an allowable common difference and the thus defined rows of the pellets can be also automatically loaded into one or more fuel cladding tubes. Moreover, in these operations, the confusion of the differnet kind of fuel pellets into the required kind thereof can be completely prevented in the respective sections, thus securely maintaining the quality of produced fuel rod. In addition, the definition of the row length of the fuel pellets can be achieved with desired high speed and the setting of the row length can be also easily done by controlling the position of the stopper device or the length defining pawl member with high efficiency. Furthermore, in use of a jig having the specific construction so as to bridge across the transporting tray and the aligning tray, the nuclear fuel pellets can be smoothly transferred from one tray to the other tray even in a case where the grooves formed on both the trays do not substantially align with each other, thus surely preventing the pellets from falling down or being damaged because of the existence of the level difference between these trays.

In the foregoing description, although the nuclear fuel pellet row length defining mechanism or device is mainly discussed with the nuclear fuel pellet loading apparatus, a weighing technique of a fuel rod is a matter of important problem for the nuclear fuel pellet loading apparatus. Regarding the measurement of the weight of the nuclear fuel rod, in a conventional method, a row of nuclear fuel pellets having a predetermined length corresponding to one fuel rod is weighed by a weighing device and then loaded into a cladding tube. In this art of field, however, it has been required to arrange side by side plural rows of the nuclear fuel pellets corresponding to a plurality of fuel cladding tubes and then to load all of these pellet rows at once into the corresponding cladding tubes. In this fuel pellet cladding technique, the adaptation of the measuring method of weighing rows of fuel pellets one by one with a plurality of weighing devices requires much labor and troublesome works as well as economical problem. The weight of the row of the nuclear fuel pellets is measured, in the other conventional method, by measuring the weight of the fuel cladding tubes before and after the loading of the fuel pellets into the cladding tube. This conventional method also reveals problems in the transferring technique and transferring time.

Figure 50:
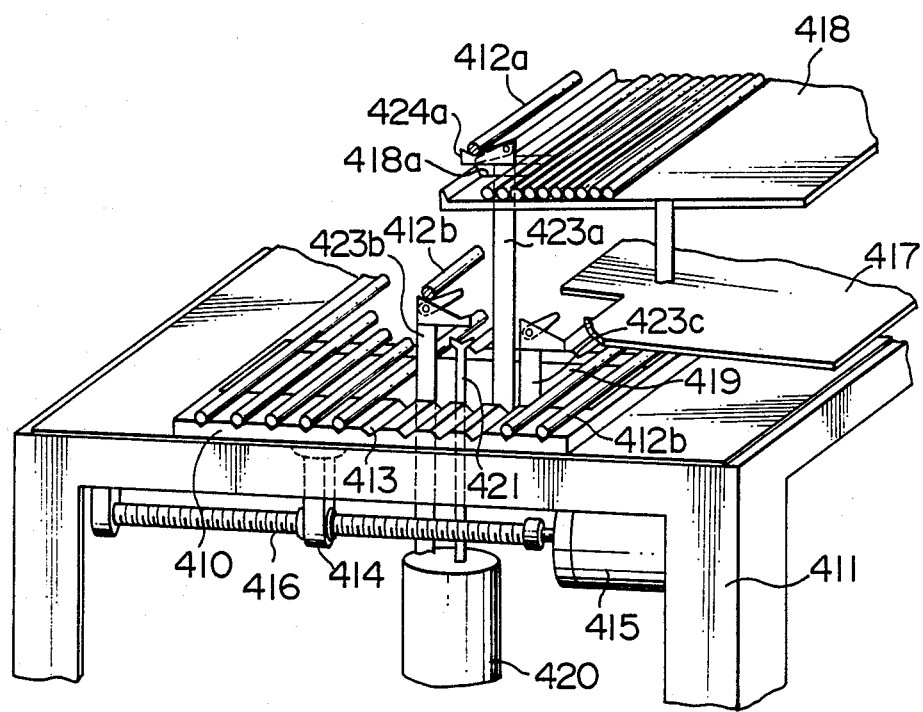
FIG. 50 is a schematic perspective view showing a fuel rod transferring device located in association with a fuel pellet cladding tube handling unit shown in FIG. 6.
Figure 51:
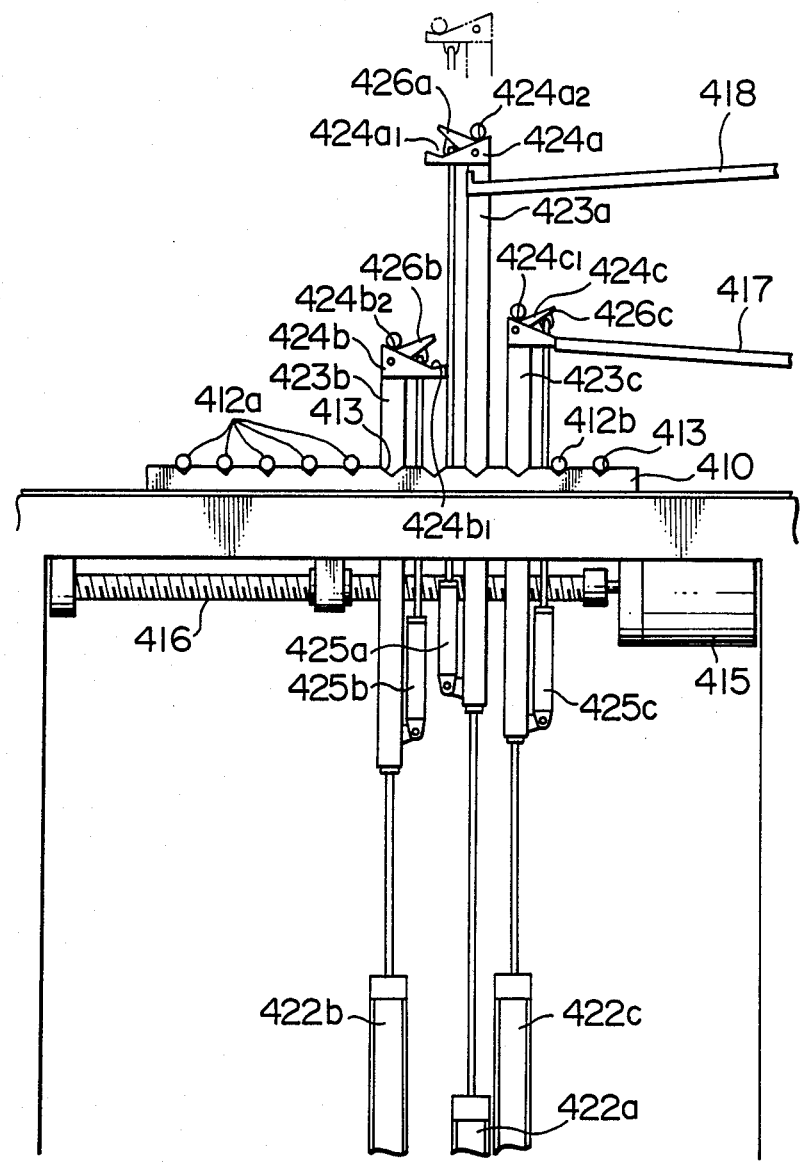
FIG. 51 shows a front view of the device shown in FIG. 50.

According to this invention, these problems about the weighing technique of the nuclear fuel pellets will be eliminated by providing a device shown in FIGS. 50 through 52 in association with the cladding tube handling unit 100 shown in FIG. 6, and particularly in association with the first and second stack tables 12 and 14 shown in FIG. 9.

Referring to FIG. 50, a pellet loading table 410 is disposed on a base frame 411 and a plurality of grooves 413 are formed on the surface of the loading table 410 in parallel with each other and with equal spaces therebetween so as to mount or rest fuel cladding tubes 412a or fuel rods 412b on predetermined positions. A bracket 414 attached to the lower surface of the table 410 is engaged with a screwed shaft 416 extending in a direction normal to the extending direction of the grooves 413 and being intermittently driven by an electric motor 415 so that the pellet loading table 410 can be moved horizontally in a direction normal to the extending direction of the grooves 413 by the intermittent rotation of the screwed shaft 416.

A fuel rod delivery rack 417 is disposed above the loading table 410 so as to incline slightly downwardly, outwardly and rightwardly as viewed in FIG. 50, of the loading table 410 and a fuel cladding tube supplying rack 418 is also disposed above the derivery rack 417 so as to incline slightly downwardly inwardly of the loading table 410, i.e. the reverse inclining direction to that of the rack 417.

The pellet loading table 410 is provided with a slit 419, extending the longitudinal direction thereof, through which penetrate support rods 421, only one is illustrated, to support the cladding tube 412a at at least two points, the support rods 421 connected to a weighing device for weighing the cladding tube 412a or fuel rod 412b. On one side of the support rods 421 are vertically disposed the first and third transferring mechanisms 423a and 423c operated vertically by cylinder means 422a and 422c, respectively, and on the other side thereof is also vertically disposed the second transferring mechanism 423b operated vertically by cylinder means 422b.

A support piece 424a is attached to the end of the first transferring mechanism 423a so as to project in the horizontal direction as shown in FIG. 51 and the support piece 424a is provided with substantially the V-shaped groove or cut-out portion to form a supporting portion $424a_1$. A swingable piece 426a operated by cylinder means 425a is atatched pivotally about the horizontal shaft of the support piece 424a so that when the front end of the swingable piece 426a is pivoted over the upper surface of the support piece 424a, a V-shaped groove or cut-out portion $424a_2$ is formed by the swingable piece 426a and the inclining surface of the support piece 424a as shown in FIG. 51. These mechanisms are arranged so that the first support portion $424a_1$ is positioned in a vertical plane including the central axis of the support rods 21 of the weighing device 420 and that the second support portion $424a_2$ is positioned in a vertical plane including the axis of the cladding tube 412a located at the most front position on the cladding tube supporting rack 418. A support piece 424b and a swingable piece 426b substantially identical to those 424a and 426a are disposed at the top end of the second transferring mechanism 423b so that the first support portion $424b_1$ formed by the support piece 424b is positioned in a vertical plane including the axis of the cladding tube 412a mounted on the support rods 421 of the weighing device 420 and that the second support portion $424b_2$ formed by the support piece 424b and the swingable piece 426b is positioned in a vertical plane including the groove 413 moved to the predetermined position in accordance with the movement of the loading table 413.

Furthermore, on the top end of the third transferring mechanism 423c, are disposed a swingable piece 426c driven by cylinder means 425c and a support piece 424c having an upper surface downwardly inclining towards the fuel rod derivery rack 417 and having the front end movable in the vicinity of the end edge portion of the derivery rack 417 to form a V-shaped support portion $424c_1$ by the support piece 424c and the swingable piece 426c so that the support portion $424c_1$ is positioned in a vertical plane including the axis of the groove 413 of the loading table 410.

The operation of the device according to this invention shown in FIGS. 50 to 52 will now be described.

In a case where clading tubes 412a are to be transferred from the cladding tube supplying rack 418 to the loading table 410, the swingable piece 426a of the first transfer mechanism 423a is moved to the upper position by the cylinder means 425a, and the first transfer mechanism 423a is then shifted upward through the cut-away portion 418a formed at the forward part of the cladding tube supplying rack 418. As a consequence, a cladding tube 412a mounted on the cladding tube supplying rack 418 at the foremost position thereof is held by the second supporting portion $423a_2$ of the first transfer member 423a and is lifted upward as shown in FIG. 51.

When the swingable piece 426a is then moved to the lower position, the cladding tube 412a rolls down along the tapered surface of the supporting piece 424a so that it is supported by the first supporting portion $424a_1$ of the first transfer member 423a. When the first transfer mechanism 423a is shifted downward in this state, the cladding tube 412a is placed on the supporting rod 421 of the weight measuring device 420, and the weight of the cladding tube is measured by the device 420.

Figure 52A:
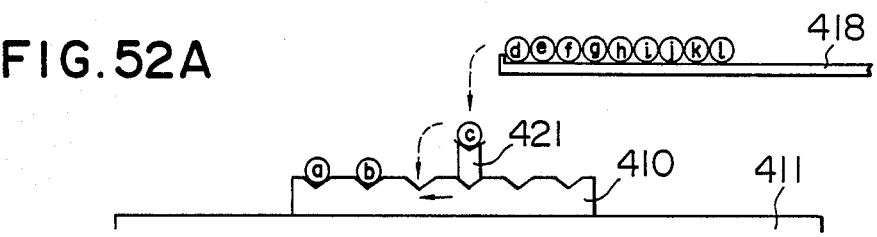
FIGS. 52A through 52E are views of the essential part of the transferring device shown in FIG. 50 for explaining the sequence of the transferring operation.
Figure 52B:
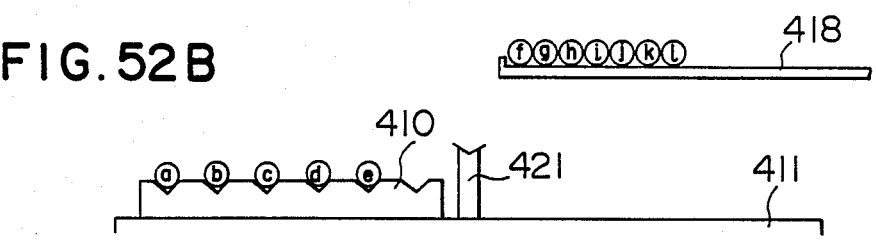

After the weighing operation, the second transfer mechanism 423b is moved upward so that the first supporting portion $423b_1$ thereof brings the cladding tube 412a thus weighed upward. When the swingable piece 425b of the second transfer mechanism 423b is swung to the upper position, the cladding tube 412a is transferred from the first supporting portion $423b_1$ to the second supporting portion $423b_2$. When the second transfer mechanism 423b is shifted downward, the cladding tube 412a is placed in one of the grooves 413 provided on the loading table 410 as shown in FIG. 52A. Similar operation is repeated until a required number of cladding tubes 412a are placed in alignment on the loading table 410 as shown in FIG. 52B.

Then nuclear fuel pellets are loaded by a pellet loading apparatus, not shown, into each of the cladding tubes 412a.

When the pellets have been loaded in the cladding tubes 412a, one of the fuel rods 412b thus loaded with the pellets, which is located in the nearmost position to the weight measuring device 420, is lifted upward on the second suporting portion $423b_2$ of the second transfer mechanism 423b. At the uppermpost position, the fuel rod 412b is moved to the first supporting portion $423b_1$ of the transfer member 423b. Along with the lowering of the second transfer mechanism 423b, the fuel rod 412b is transferred onto the supporting rod 421 of the weight measuring device 420. The device 420 measures the weight of the fuel rod 412b loaded with the fuel pellets, and detects the weight of the loaded pellets from the difference in weight between the cladding tube 412a and the fuel rod 412b which is loaded with the pellets.

Figure 52C:
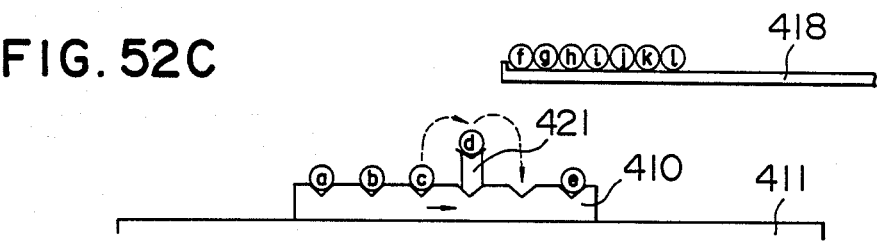
Figure 52D:
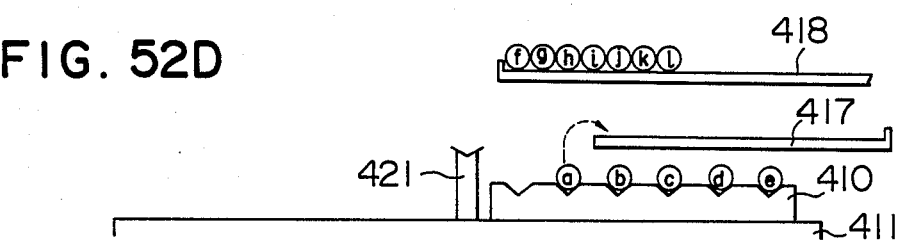

When the weight of a fuel rod 412b is thus measured, the rod is lifted upward by the first transfer mechanism 423a, shifted between the supporting portions $424a_1$ and $424a_2$, brought downward, and then is placed in one of the grooves 413 brought into the opposite side of the weight measuring device 420 as shown in FIG. 52C. Then the loading table 410 is rightwardly shifted one pitch after another as viewed in FIG. 50, and the above described operation is repeated for the subsequent fuel rods 412b until all the fuel rods 412b are weighed and arranged in the grooves 412 of the loading table 410 which is shifted on the opposite side of the weight measuring device 420 as shown in FIG. 52D.

Figure 52E:
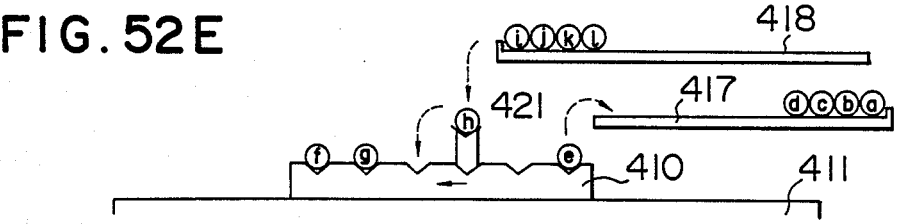

Thereafter, the fuel rods 412b placed on the loading table 410 are successively lifted by means of the third transfer mechanism 423c starting from a fuel rod located at a position nearmost to the weight measuring device 420, and along with the movement of the swingable piece 426c of the third transfer mechanism 423c, the fuel rods 412b are transferred onto the fuel rod delivering rack 417 as shown in FIG. 52E. In this manner the order of delivering the fuel rods 412b out of the delivering rack 417 is made equal to that of supplying the cladding tubes onto the loading table 410.

Furthermore, when the fuel rods 412b are placed on the fuel rod delivering rack 417 as shown in FIG. 52E, the loading table 410 is stepwisely returned to the position where the pellets are to be loaded into the cladding tubes 412a, and during the returning movement of the loading table 410 to this position, the cladding tubes 412a are newly transferred from the cladding tube supplying rack 418 to the loading table 410. That is, the transfer of the fuel rods 412b from the loading table 410 to the fuel rod delivering rack 417 can be carried out simultaneously with the supplying operation of the cladding tube 412a from the cladding tube supplying rack 418 to the loading table 410, so that the time required for these operations can be thereby reduced.

Since the construction of this invention is constructed as described above, even in a case where the apparatus for loading pellets is of a type capable of loading pellets into a plurality of cladding tubes simultaneously, the weights of the cladding tubes 412a and the fuel rods 412b produced from the tubes 412a can be measured by a single weight measuring device 420, and hence the weighing operation control of the embodiment can be economized. In addition, the production control in the embodiment can be simplified because the order of delivering the fuel rods can be made equal to that of supplying the cladding tubes, and since the transfer of the fuel rods from the loading table to the fuel rod delivering rack can be carried out simultaneously with the supplying operation of the cladding tubes onto the loading table, the productivity of the embodiment can be improved remarkably.

What is claimed is:

1. An apparatus for automatically loading two or more kinds of columnar nuclear fuel pellets in a fuel cladding tube for producing a nuclear fuel rod, said kinds of pellets having predetermined lengths ($A_1, A_2, \ldots A_5$) of a row of the pellets, respectively, said apparatus comprising:

at least one pellet transporting tray provided with a plurality of parallel grooves in which the nuclear fuel pellets are placed in parallel rows;

at least one pellet aligning tray provided with a groove which is selectively connectable, in alignment, with one of the grooves of said pellet transporting tray at one end of the pellet aligning tray;

a fuel cladding tube supporting device which is located in the vicinity of the other end of said aligning tray and which supports fuel cladding tubes in parallel rows, said tube supporting device being operable such that a selected one fuel cladding tube is connected with the groove of said aligning tray in an aligned manner;

a stopper device located adjacent said aligning tray and having a stopper member movable into the groove of the aligning tray for restricting movement of a row of the pellets in the groove of the aligning tray in a longitudinal direction of the groove toward the stopper member, said stopping device also having means for adjustably moving the stopper member in said groove;

means for transferring a row of pellets on the transporting tray into said groove of the pellet aligning tray until the leading pellet of the row abuts against said stopper member;

a pellet row length defining device located adjacent said aligning tray, said length defining device having a pellet engaging member movable adjustably along the length of, and transversely into, the groove of the aligning tray to engage a specific pellet or pellets in the row transferred into the groove of the pellet aligning tray, at a position spaced apart from said stopper member moved into the groove by a distance corresponding substantially to a predetermined length of row of the pellets to be loaded into the tube and in such a manner as to enable discrimination of said predetermined length of row of the pellets, inclusive or exclusive of said specific pellet or pellets, from the rest of the row; and a device for pushing said discriminated predetermined length of row on the aligning tray into a selected cladding tube aligned with the row.

2. The apparatus according to claim 1, wherein said pellet engaging member is a pawl member carried on a mechanism movable along the length of the groove of the aligning tray and has operatively connected therewith means for moving the pawl member into the groove of the aligning tray such that the pawl member pushes temporarily said specific pellet or pellets out of alignment with the rest of the pellets in the row, means being provided to move said structure away from said stopper device such that the pellets excluding the predetermined length of row of the pellets, which includes said specific pellet or pellets, is moved away from the stopper device by means of said pawl member whereby only the predetermiend length of row is left in the groove.

3. The apparatus according to claim 1, wherein said pellet engaging member is a pawl member carried on a mechanism movable along the length of the groove of the aligning tray and has operatively connected therewith means for moving the pawl member into the groove of the aligning tray such that the pawl member pushes temporarily said specific pellet or pellets out of alignment with the rest of the pellets in the row, said device for pushing the discriminated predetermiend length of row into a selected cladding tube being said mechanism movable along the length of the groove of the aligning tray and the pawl member, which upon operation of the mechanism pushes the predetermined length of row of the pellets excluding said specific pellet or pellets into the cladding tube.

4. The apparatus according to claim 1, wherein said pellet engaging member is a gripping means for gripping said specific pellet or pellets, said gripping means being mounted on a mechanism movable along the length of the groove of the aligning tray, means being provided to operate said mechanism to move the gripping means away from the stopper device such that the pellets excluding the predetermined length of row of the pellets are moved away from the stopper device by means of the gripping means gripping the specific pellet or pellets, whereby the predetermined length of row is left in the groove.

5. The apparatus according to claim 1, wherein said pellet engaging member is a gripping means for gripping said specific pellet or pellets, said gripping means being mounted on a mechanism movable along the length of the groove of the aligning tray said device for pushing the discriminated predetermined length of row into a selected cladding tube being said mechanism and the gripping means, which upon operation of the mechanism pushes the predetermined length of row of the pellets including said specific pellet or pellets into the cladding tube.

6. The apparatus according to claim 1, wherein said means for transferring a row of pellets on the transporting tray into the groove of the pellet aligning tray comprises a pusher device for pushing the row of pellets into the groove and a pusher member for shifting the row thus pushed into the groove until the leading pellet of the row abuts against said stopper member.

7. The apparatus according to claim 1 which further comprises a pushing member for transferring a row of nuclear fuel pellets mounted in one groove of said pellet transporting tray into the groove of the aligning tray and for transferring some pellets of the row back into said groove of the pellet transporting tray from the groove of the aligning tray.

8. The apparatus according to claim 7 wherein said pushing member is operated through slip means so as to stop the operation of the pushing member when a load applied to the pushing member is over a predetermined value.

9. The apparatus according to claim 3 wherein said groove of the aligning tray has a V-shaped cross section and said pellet row length defining device is located at such an upper position relative to the aligning tray that said pawl member is obliquely inserted into said V-shaped groove from above the aligning tray.

10. The apparatus according to claim 2 wherein said groove of the aligning tray has a bottomless V-shaped cross section and said pellet row length defining device is located at a lower position relative to said aligning tray so that said pawl member is inserted into said bottomless V-shaped groove from below the aligning tray.

11. The apparatus according to claim 9 wherein said V-shaped groove of the aligning tray has inner surfaces having inclinations different from each other so that the pellet removed from the axis of said V-shaped groove is not moved together with said pawl member when the pawl member moves in the axial direction of said groove therealong.

12. The apparatus according to claim 9 wherein a stop member is disposed on a side portion of said V-shaped groove of said aligning tray so as to restrict an axial movement of the pellet pushed out of alignment with said V-shaped groove so that the removed pellet is not moved together with said pawl member when the pawl member moves in the axial direction of said groove theralong.

13. The apparatus according to claim 10 wherein said V-shaped groove of the aligning tray has inner surfaces having inclinations different from each other so that the pellet pushed out of alignment with the axis of said V-shaped groove is not moved together with said pawl member when the pawl member moves in the axial direction of said groove therealong.

14. The apparatus according to claim 10 wherein a stop member is disposed on a side portion of said V-shaped groove of said aligning tray so as to restrict an axial movement of the pellet pushed out of alignment with the axis of said V-shaped groove so that the removed pellet is not moved together with said pawl member when the pawl member moves in the axial direction of said groove therealong.

15. The apparatus according to claim 2 wherein said predetermined position at which said pawl member is inserted into said groove of the aligning tray is spaced apart from said stopper member by a distance corresponding to a minimum length obtained by subtracting a tolerance of the predetermined length of the pellet row from said predetermined length.

16. The apparatus according to claim 5 wherein said gripping means grips said specific pellet or pellets transferred in the groove of said aligning tray at said position spaced apart from said stopper device by a distance corresponding to a maximum length obtained by subtracting a tolerance of the predetermined length of the pellet row from said predetermined length.

17. The apparatus according to claim 4 wherein said gripping means grips said specific pellet or pellets transferred in the groove of said aligning tray at said position spaced apart from said stopper device by a distance corresponding to a minimum length obtained by adding a tolerance of the predetermined length of the pellet row to said predetermined length of the pellet row.

18. The apparatus according to claim 1 wherein said aligning tray is provided with a plurality of grooves which are respectively connected with corresponding grooves of said transporting tray so that the pellets arranged in the grooves of said transporting tray are transferred into the grooves of the aligning tray all at once or independently.

19. The apparatus according to claim 18 wherein a plurality of stopper members are disposed with respect to the respective grooves of the aligning tray.

20. The apparatus according to claim 1 wherein a support rail member is provided between said transporting tray and said alinging tray so that said rail member has end portions which are disposed in said grooves of said transporting and aligning trays, respectively, and also has a central portion from which said rail member inclines downwardly towards said end portions thereof and guide plates are disposed along upper side portions of said rail member for guiding said nuclear fuel pellets which are being transferred along and on said rail member.

21. The apparatus according to claim 20 wherein one end portion of said rail member is pivotally attached to a shaft member located in one of the grooves of said transporting tray and said aligning tray.

22. The apparatus according to claim 20 wherein said rail member is supported by a support member through spring means to be movable in a vertical direction and said support member is connected to a drive mechanism so as to vertically move said support member thereby to forcibly press both the ends of said rail member against said grooves of said transporting tray and said aligning tray.

23. The apparatus according to claim 20 wherein the end portions of said rail member are formed to exhibit shapes matching the shapes of said grooves of said transporting tray and said aligning tray.

24. The apparatus according to claim 23 wherein said grooves of said transporting tray and said aligning tray are formed so as to have V-shapes in cross section, respectively.

25. The apparatus according to claim 1 wherein said fuel cladding tube supporting device includes a fuel cladding tube transfer mechanism comprising a support member on which a plurality of fuel rods are supported in parallel with each other and with equal spaces therebetween, a loading table horizontally movable by a predetermined pitch in a direction normal to an axis of the fuel rod on said support member, a weight measuring means, a fuel cladding tube supply rack on which a plurality of fuel clading tubes are arranged, a first transferring member for vertically transferring one fuel cladding tube on said cladding tube supply rack onto said weight measuring means and transferring a fuel rod, into which fuel pellets had already been loaded and which is disposed on said weight measuring means, to a predetermined position of said loading table, a second transferring member for vertically transferring the fuel cladding tube transferred on said weight measuring means onto a predetermined portion of said loading table and transferring the fuel rod with the loaded fuel pellets on said loaded table onto said weight measuring means, a fuel rod delivery rack located near said loading table, and a third transferring member for vertically transferring the fuel rod after the weight measurement thereof on said loading table onto said fuel rod delivery rack.

26. The apparatus according to claim 25 wherein a support piece and a swingable piece are disposed at a top end of each of said first, second and third transferring members with an operative connection to thereby form a support portion for the fuel cladding tube and the fuel rod.

27. The apparatus according to claim 25 wherein each of the support pieces of said first and second transferring members is provided with another support portion for supporting the fuel cladding tube or the fuel rod which is supported by the aforementioned support portion and fed to said another support portion when said swingable piece is downwardly swung and moved horizontally.

28. The apparatus according to claim 25 wherein the weight of the fuel pellets loaded into the fuel cladding tube is measured by subtracting the weight of the fuel cladding tube measured by the weight measuring means from the weight of the fuel rod measured by the weight measuring means.

* * * * *